United States Patent
Yip et al.

(10) Patent No.: US 10,755,281 B1
(45) Date of Patent: Aug. 25, 2020

(54) PAYMENT TRANSACTION AUTHENTICATION SYSTEM AND METHOD

(71) Applicant: Square, Inc., San Francisco, CA (US)

(72) Inventors: Timothy Yip, Point Richmond, CA (US); Brian Mullins, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/476,657

(22) Filed: Mar. 31, 2017

(51) Int. Cl.
| | | |
|---|---|---|
| *G06Q 40/00* | (2012.01) | |
| *G06Q 20/40* | (2012.01) | |
| *G06Q 20/20* | (2012.01) | |
| *G06Q 20/34* | (2012.01) | |
| *G06Q 20/38* | (2012.01) | |

(52) U.S. Cl.
CPC ......... *G06Q 20/405* (2013.01); *G06Q 20/202* (2013.01); *G06Q 20/34* (2013.01); *G06Q 20/385* (2013.01); *G06Q 20/4016* (2013.01)

(58) Field of Classification Search
CPC .... G06Q 20/405; G06Q 20/202; G06Q 20/34; G06Q 20/385; G06Q 20/4016
USPC .......................................................... 705/44
See application file for complete search history.

(56) References Cited

U.S. PATENT DOCUMENTS

| | | |
|---|---|---|
| 3,863,050 A | 1/1975 | Brugger et al. |
| 4,048,476 A | 9/1977 | Lawter et al. |
| 5,859,414 A * | 1/1999 | Grimes .............. G06K 17/0022 235/375 |
| 6,311,165 B1 | 10/2001 | Coutts et al. |
| 6,330,546 B1 * | 12/2001 | Gopinathan ........... G06Q 20/00 705/35 |
| 7,376,618 B1 * | 5/2008 | Anderson .............. G06Q 20/10 705/38 |
| 7,702,553 B1 | 4/2010 | Dickelman |

(Continued)

FOREIGN PATENT DOCUMENTS

| | | |
|---|---|---|
| EP | 2 579 194 A1 | 4/2013 |
| WO | 2013/147904 A1 | 10/2013 |

(Continued)

OTHER PUBLICATIONS

Bank of america corporation; patent issued for dynamic authentication engine. (Jun. 19, 2014). Computer Weekly News Retrieved from http://dialog.proquest.com/professional/docview/1534570020?accountid=131444 on Feb. 6, 2020 (Year: 2014).*

(Continued)

*Primary Examiner* — Kito R Robinson
(74) *Attorney, Agent, or Firm* — Lee & Hayes, P.C.

(57) ABSTRACT

This disclosure describes, in part, techniques for validating a payment transaction between a customer and a merchant via challenge questions. For instance, the method includes determining, by a payment processing system, a level of risk associated with a current payment transaction between the merchant and the customer; in response the level of risk being higher than a threshold, obtaining a query for the customer, wherein the query is based at least on the current payment transaction or one or more past transactions involving the customer; receiving, from a customer device associated with the customer, a response to the query; and validating the current payment transaction based on the response.

20 Claims, 12 Drawing Sheets

(56) References Cited

U.S. PATENT DOCUMENTS

| | | | |
|---|---|---|---|
| 7,783,515 B1* | 8/2010 | Kumar | G06Q 10/10 705/16 |
| 7,788,195 B1* | 8/2010 | Subramanian | G06N 20/00 706/20 |
| 8,397,988 B1* | 3/2013 | Zuili | G06Q 20/341 235/383 |
| 8,498,900 B1 | 7/2013 | Spirin et al. | |
| 8,606,696 B1* | 12/2013 | Halpern | G06Q 40/02 379/91.01 |
| 8,745,698 B1* | 6/2014 | Ashfield | H04L 63/08 726/4 |
| 8,762,272 B1 | 6/2014 | Cozens et al. | |
| 8,856,894 B1* | 10/2014 | Dean | H04L 63/08 713/175 |
| 8,990,121 B1 | 3/2015 | Guise et al. | |
| 9,125,180 B1 | 9/2015 | Hamilton et al. | |
| 9,165,296 B2 | 10/2015 | Gannon | |
| 9,166,999 B1* | 10/2015 | Kulkarni | H04L 63/1433 |
| 9,286,500 B1 | 3/2016 | Post et al. | |
| 9,373,112 B1* | 6/2016 | Henderson | G06Q 20/40 |
| 9,396,730 B2* | 7/2016 | Karpey | H04M 3/493 |
| 9,436,335 B1 | 9/2016 | Scherer et al. | |
| 9,530,128 B1 | 12/2016 | Bekmann et al. | |
| 9,633,322 B1* | 4/2017 | Burger | G06Q 10/0635 |
| 9,767,471 B1* | 9/2017 | Perrone | G06Q 30/0631 |
| 9,818,093 B1 | 11/2017 | Grier | |
| 9,836,732 B1 | 12/2017 | Mocko et al. | |
| 9,852,410 B1 | 12/2017 | Chen et al. | |
| 9,996,829 B1 | 6/2018 | Baig et al. | |
| 10,049,349 B1 | 8/2018 | Grassadonia et al. | |
| 10,062,078 B1* | 8/2018 | Boates | G06Q 20/4016 |
| 10,068,235 B1* | 9/2018 | Boates | G06Q 20/389 |
| 10,163,107 B1 | 12/2018 | White et al. | |
| 10,185,958 B2 | 1/2019 | Henderson et al. | |
| 10,339,525 B2 | 7/2019 | Bogaard | |
| 10,366,378 B1 | 7/2019 | Han et al. | |
| 10,460,317 B2 | 10/2019 | Chitilian et al. | |
| 10,515,354 B1 | 12/2019 | Ishaq | |
| 2002/0099649 A1* | 7/2002 | Lee | G06Q 20/04 705/38 |
| 2002/0133409 A1* | 9/2002 | Sawano | G06Q 20/20 705/16 |
| 2004/0034612 A1* | 2/2004 | Mathewson | G06Q 10/06 706/46 |
| 2004/0148252 A1 | 7/2004 | Fleishman | |
| 2005/0071232 A1 | 3/2005 | Frater | |
| 2006/0000900 A1* | 1/2006 | Fernandes | G06Q 20/04 235/380 |
| 2006/0151598 A1* | 7/2006 | Chen | G06Q 20/20 235/380 |
| 2006/0224507 A1* | 10/2006 | Torpin | G06Q 10/08 705/40 |
| 2006/0240890 A1 | 10/2006 | Walker et al. | |
| 2006/0249574 A1 | 11/2006 | Brown et al. | |
| 2006/0255128 A1 | 11/2006 | Johnson et al. | |
| 2007/0106609 A1* | 5/2007 | Phillips | G06Q 20/12 705/40 |
| 2007/0108279 A1 | 5/2007 | Wang | |
| 2007/0226095 A1* | 9/2007 | Petriuc | G06Q 10/04 705/35 |
| 2008/0005037 A1* | 1/2008 | Hammad | G06Q 20/085 705/67 |
| 2008/0208743 A1 | 8/2008 | Arthur et al. | |
| 2008/0238610 A1 | 10/2008 | Rosenberg | |
| 2008/0319869 A1* | 12/2008 | Carlson | G06Q 20/02 705/26.1 |
| 2009/0006151 A1* | 1/2009 | Zarghami | G06Q 10/06375 705/7.31 |
| 2009/0048936 A1 | 2/2009 | Lerch et al. | |
| 2009/0055276 A1 | 2/2009 | Dunsmore et al. | |
| 2009/0164374 A1 | 6/2009 | Shastry | |
| 2010/0005013 A1 | 1/2010 | Uriarte | |
| 2010/0023204 A1* | 1/2010 | Basir | G06F 1/3203 701/31.4 |
| 2010/0057612 A1 | 3/2010 | Wagenhals | |
| 2010/0063945 A1 | 3/2010 | Cowan, Jr. | |
| 2010/0097946 A1 | 4/2010 | Celentano et al. | |
| 2010/0114776 A1* | 5/2010 | Weller | G06F 21/31 705/44 |
| 2010/0299195 A1 | 11/2010 | Nix et al. | |
| 2010/0305993 A1* | 12/2010 | Fisher | G06Q 10/0635 705/7.28 |
| 2011/0047075 A1 | 2/2011 | Fourez | |
| 2011/0131122 A1* | 6/2011 | Griffin | G06Q 40/00 705/35 |
| 2011/0131130 A1* | 6/2011 | Griffin | G06Q 40/00 705/38 |
| 2011/0254655 A1 | 10/2011 | Maalouf et al. | |
| 2011/0313871 A1 | 12/2011 | Greenwood | |
| 2012/0054102 A1 | 3/2012 | Schwartz et al. | |
| 2012/0072349 A1 | 3/2012 | Bernstein et al. | |
| 2012/0123935 A1 | 5/2012 | Brudnicki et al. | |
| 2012/0173410 A1 | 7/2012 | Gillin | |
| 2012/0310744 A1 | 12/2012 | Kim et al. | |
| 2012/0317013 A1* | 12/2012 | Luk | G06Q 20/4016 705/38 |
| 2013/0013352 A1 | 1/2013 | Fisher | |
| 2013/0073347 A1 | 3/2013 | Bogaard et al. | |
| 2013/0080331 A1 | 3/2013 | Granbery et al. | |
| 2013/0103482 A1* | 4/2013 | Song | G06Q 30/02 705/14.26 |
| 2013/0132274 A1 | 5/2013 | Henderson et al. | |
| 2013/0132854 A1 | 5/2013 | Raleigh et al. | |
| 2013/0198076 A1 | 8/2013 | Zambelli Hosmer et al. | |
| 2013/0218721 A1 | 8/2013 | Borhan et al. | |
| 2013/0218757 A1 | 8/2013 | Ramanathan et al. | |
| 2013/0226318 A1 | 8/2013 | Procyk et al. | |
| 2013/0254115 A1 | 9/2013 | Pasa et al. | |
| 2013/0282589 A1 | 10/2013 | Shoup et al. | |
| 2013/0297512 A1 | 11/2013 | Phillips et al. | |
| 2013/0332293 A1 | 12/2013 | Ran | |
| 2013/0346222 A1 | 12/2013 | Ran | |
| 2014/0172551 A1* | 6/2014 | Desai | G06Q 30/0255 705/14.47 |
| 2014/0195272 A1 | 7/2014 | Sadiq et al. | |
| 2014/0207683 A1 | 7/2014 | Bailey et al. | |
| 2014/0258055 A1 | 9/2014 | Wolfe et al. | |
| 2014/0279113 A1 | 9/2014 | Balasubramanian | |
| 2014/0310113 A1 | 10/2014 | Sengupta et al. | |
| 2014/0312118 A1 | 10/2014 | Marcus et al. | |
| 2014/0344151 A1 | 11/2014 | Soundararajan | |
| 2014/0364148 A1 | 12/2014 | Block et al. | |
| 2014/0375428 A1 | 12/2014 | Park | |
| 2015/0041534 A1 | 2/2015 | Rayner et al. | |
| 2015/0074366 A1 | 3/2015 | Calciu et al. | |
| 2015/0081557 A1 | 3/2015 | Kinfoil et al. | |
| 2015/0106216 A1* | 4/2015 | Kenderov | G06Q 20/4014 705/21 |
| 2015/0106260 A1* | 4/2015 | Andrews | G06Q 20/4016 705/39 |
| 2015/0120560 A1* | 4/2015 | Fisher | G06Q 20/4014 705/44 |
| 2015/0220925 A1* | 8/2015 | Brickell | G06Q 20/36 705/41 |
| 2015/0242662 A1 | 8/2015 | Claessen | |
| 2015/0277967 A1 | 10/2015 | Calciu et al. | |
| 2015/0332223 A1 | 11/2015 | Aaron et al. | |
| 2015/0339648 A1 | 11/2015 | Kushevsky et al. | |
| 2015/0379506 A1 | 12/2015 | Griffin | |
| 2016/0050203 A1 | 2/2016 | Hefetz | |
| 2016/0055538 A1 | 2/2016 | Todasco | |
| 2016/0063480 A1 | 3/2016 | Ballesteros et al. | |
| 2016/0117670 A1 | 4/2016 | Davis | |
| 2016/0142174 A1 | 5/2016 | Fine et al. | |
| 2016/0227359 A1 | 8/2016 | Hurewitz et al. | |
| 2017/0004475 A1 | 1/2017 | White et al. | |
| 2017/0076291 A1 | 3/2017 | Cairns | |
| 2017/0091765 A1 | 3/2017 | Lloyd et al. | |
| 2017/0200144 A1 | 7/2017 | Chatterton | |
| 2017/0262827 A1 | 9/2017 | Lee | |

(56) References Cited

U.S. PATENT DOCUMENTS

| | | | |
|---|---|---|---|
| 2018/0018704 | A1 | 1/2018 | Tunnell et al. |
| 2018/0315038 | A1 | 1/2018 | Rezayee |
| 2018/0268408 | A1 | 9/2018 | Botros et al. |
| 2019/0021133 | A1 | 1/2019 | Vandenheste |
| 2019/0287108 | A1 | 9/2019 | White et al. |
| 2019/0347661 | A1 | 11/2019 | Grenader et al. |
| 2020/0034822 | A1 | 1/2020 | Rezayee et al. |

FOREIGN PATENT DOCUMENTS

| | | |
|---|---|---|
| WO | 2014/174261 A1 | 10/2014 |
| WO | 2018/125444 A1 | 7/2018 |
| WO | 2018/175462 A1 | 9/2018 |
| WO | 2018/200962 A1 | 11/2018 |

OTHER PUBLICATIONS

"Clemson University Parking Services Parking Citations," Clemson University, dated Dec. 5, 2010, pp. 1-2.

"EMV Integrated Circuit Card Specifications for Payment Systems; Book 3: Application Specification," dated Jun. 2008, Version 4.2, Section-10.5, pp. 1-238.

"PIN Bypass in the U.S. Market," EMV Migration Forum White Paper, dated Feb. 2016, Version 1.1, retrieved from Internet URL: https://web.archive.org/web/20161020113903/http://www.emv-connection.com:80/downloads/2016/02/PIN-Bypass-WP-V1.1-Public-Release-FINAL-February-2016.pdf, on May 28, 2018, pp. 1-12.

Novak, E.J., "Security and Privacy for Ubiquitous Mobile Devices," The College of William and Mary, dated 2016, Retrieved from the Internet URL: https://search.proquest.com/docview/1831587875/ED0257082428464BPQ/8?accountid=14753, on Jan. 17, 2018, pp. 1-2.

Non-Final Office Action dated Dec. 11, 2014, for U.S. Appl. No. 14/323,747, of Wagner, D.R., filed Jul. 3, 2014.

Non-Final Office Action dated Mar. 12, 2015, for U.S. Appl. No. 14/455,577, of Bekmann, J., et al., filed Aug. 8, 2014.

Final Office Action dated Apr. 23, 2015, for U.S. Appl. No. 14/323,747, of Wagner, D.R., filed Jul. 3, 2014.

Final Office Action dated Sep. 24, 2015, for U.S. Appl. No. 14/455,577, of Bekmann, J., et al., filed Aug. 8, 2014.

Non-Final Office Action dated Oct. 21, 2015, for U.S. Appl. No. 14/323,747, of Wagner, D.R., filed Jul. 3, 2014.

Non-Final Office Action dated Oct. 23, 2015, for U.S. Appl. No. 14/307,334, of Chen, G.H., et al., filed Jun. 17, 2014.

Advisory Action dated Jan. 5, 2016, for U.S. Appl. No. 14/455,577, of Bekmann, J., et al., filed Aug. 8, 2014.

Final Office Action dated Mar. 23, 2016, for U.S. Appl. No. 14/323,747, of Wagner, D.R., filed Jul. 3, 2014.

Non-Final Office Action dated Apr. 22, 2016, for U.S. Appl. No. 14/455,577, of Bekmann, J., et al., filed Aug. 8, 2014.

Final Office Action dated May 20, 2016, for U.S. Appl. No. 14/307,334, of Chen, G.H., et al., filed Jun. 17, 2014.

Notice of Allowance dated Aug. 18, 2016, for U.S. Appl. No. 14/455,577, of Bekmann, J., et al., filed Aug. 8, 2014.

Advisory Action dated Aug. 25, 2016, for U.S. Appl. No. 14/307,334, of Chen, G.H., et al., filed Jun. 17, 2014.

Non-Final Office Action dated Feb. 27, 2017, for U.S. Appl. No. 14/307,334, of Chen, G.H., et al., filed Jun. 17, 2014.

Non-Final Office Action dated Mar. 2, 2017, for U.S. Appl. No. 15/390,918, of Baig, R., et al., filed Dec. 27, 2016.

Non-Final Office Action dated Mar. 17, 2017, for U.S. Appl. No. 14/553,704, of Mocko, C.L., et al., filed Nov. 25, 2014.

Notice of Allowance dated Aug. 3, 2017, for U.S. Appl. No. 14/553,704, of Mocko, C.L., et al., filed Nov. 25, 2014.

Non-Final Office Action dated Aug. 28, 2017, for U.S. Appl. No. 14/562,285, of Ishaq, N., filed Dec. 5, 2014.

Notice of Allowance dated Aug. 30, 2017, for U.S. Appl. No. 14/307,334, of Chen, G.H., et al., filed Jun. 17, 2014.

Final Office Action dated Sep. 11, 2017, for U.S. Appl. No. 15/390,918, of Baig, R., et al., filed Dec. 27, 2016.

Advisory Action dated Dec. 27, 2017, for U.S. Appl. No. 15/390,918, of Baig, R., et al., filed Dec. 27, 2016.

Final Office Action dated Dec. 29, 2017, for U.S. Appl. No. 14/562,285, of Ishaq, N., filed Dec. 5, 2014.

Notice of Allowance dated Jan. 26, 2018, for U.S. Appl. No. 15/390,918, of Baig, R., et al., filed Dec. 27, 2016.

Advisory Action dated Mar. 30, 2018, for U.S. Appl. No. 14/562,285, of Ishaq, N., filed Dec. 5, 2014.

International Search Report and Written Opinion for International Application No. PCT/US2017/063054, dated Feb. 13, 2018.

International Search Report and Written Opinion for International Application No. PCT/US2018/023392, dated Jun. 11, 2018.

Non-Final Office Action dated Jan. 22, 2019, for U.S. Appl. No. 14/562,285, of Ishaq, N., filed Dec. 12, 2014.

Notice of Allowance dated Aug. 15, 2018, for U.S. Appl. No. 15/087,698, of White, M.W., et al., filed Mar. 31, 2016.

International Search Report and Written Opinion for International Application No. PCT/US2018/029807, dated Jul. 26, 2018.

Non-Final Office Action dated May 6, 2019, for U.S. Appl. No. 15/489,700, of Lee, R., filed Apr. 17, 2017.

Final Office Action dated May 13, 2019, for U.S. Appl. No. 14/562,285, of Ishaq, N., filed Dec. 5, 2014.

Non-Final Office Action dated Jun. 3, 2019, for U.S. Appl. No. 15/581,972, of Rezayee, A., et al., filed Apr. 28, 2017.

Bhatla T.P., et al., "Understanding Credit Card Frauds," Jun. 2003, Tata Consultancy Services, 17 pages.

Brown C., "Netcom Unveils NFC MicroSD Add-on," Downloaded from https://www.nfcw.com/2011/06/06/37813/netcom-nfc-microsd-add-on/, Jun. 6, 2011.

Rao L., "Paypal Debuts its Newest Hardward, Beacon, a Bluetooth LE Enabled Device for Hands-Free Check Ins and Payments," http://techcrunch.com/2013/09/09palpal-debuts-its-newest-hardware-beacon-a-bluetooth-le-enabled-ievice-for-hands-free-check-ins-and-payments, Sep. 9, 2013.

Square—Pay-by-Name, Uploaded on Youtube.com by AppJudgment, Sep. 7, 2011).

Unknown, "Beacon Paypal," Retrieved from the Internet—URL: http://www.paypal.com/webapps/mpp/beacon, Jul. 17, 2014, pp. 1-4.

Notice of Allowance dated Aug. 13, 2019, for U.S. Appl. No. 14/562,285, of Ishaq, N., filed on Dec. 5, 2014.

Non-Final Office action dated Sep. 27, 2019, for U.S. Appl. No. 15/464,079, of Botros, P.A., et al., filed on Mar. 20, 2017.

Final Office Action dated Oct. 8, 2019, for U.S. Appl. No. 15/489,700, of Lee, R., filed on Apr. 17, 2017.

Non-Final Office Action dated Nov. 18, 2019, for U.S. Appl. No. 15/476,705, of Yip, T., et al., filed on Mar. 31, 2017.

Advisory Action dated Dec. 20, 2019, for U.S. Appl. No. 15/489,700, of Lee, R., filed on Apr. 17, 2017.

Final Office Action dated Jan. 10, 2020, for U.S. Appl. No. 15/581,972, of Rezayee, A., et al., filed on Apr. 28, 2017.

Non-Final Office Action dated Jan. 15, 2020, for U.S. Appl. No. 15/489,700, of Lee, R., filed on Apr. 17, 2017.

* cited by examiner

US 10,755,281 B1

PAYMENT TRANSACTION AUTHENTICATION SYSTEM AND METHOD

BACKGROUND

Merchants may conduct transactions for items and services with customers. During a transaction between a merchant and a customer, the merchant can use a point-of-sale (POS) device to input information associated with the transaction. It is desirable to have mechanisms that ensure that a customer who is using a portable customer device such as a credit card is really the customer who is associated with the credit card. Fraudulent activity can be very costly to merchants, issuers of portable customer devices, and others. In one conventional customer authentication process, a customer is asked to supply his or her zip code or other personally identifiable information. While such conventional authentication methods are somewhat effective, they are typically static. If someone has stolen a customer's portable customer device and knows the customer's zip code, for example, that person could still conduct fraudulent transactions using the authentic portable customer device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
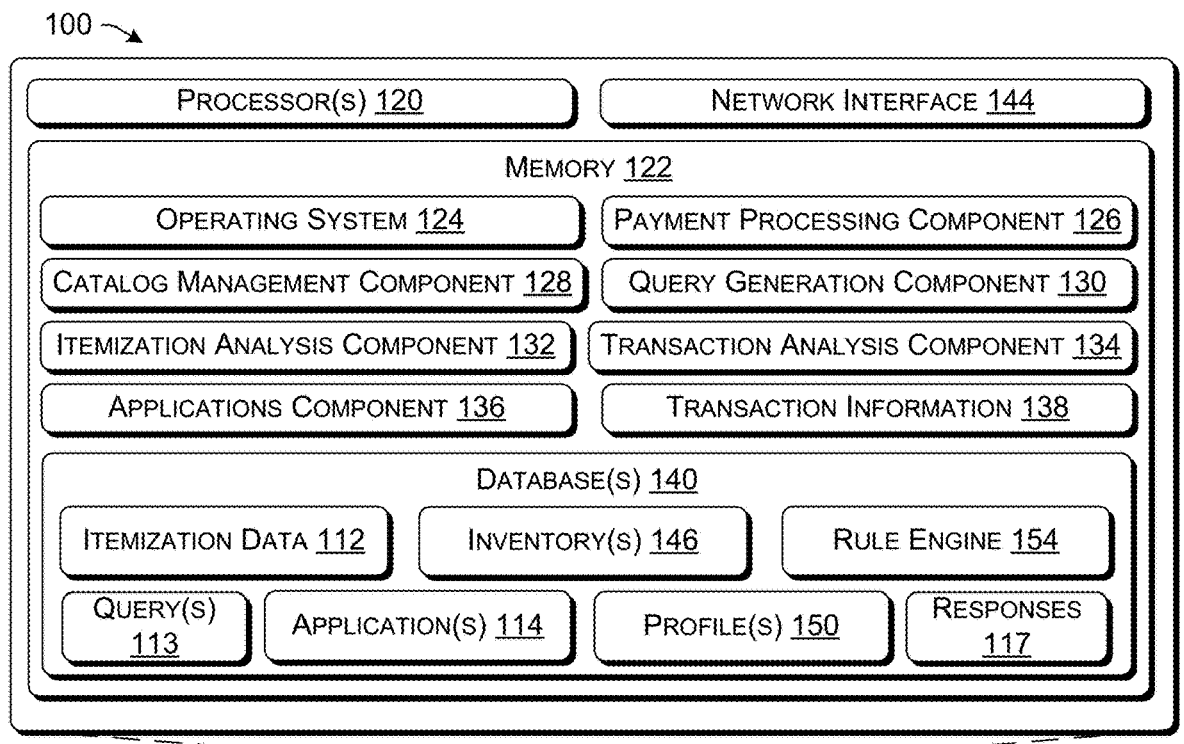
FIG. 1 illustrates an example environment in which techniques discussed herein may be implemented.
Figure 1:
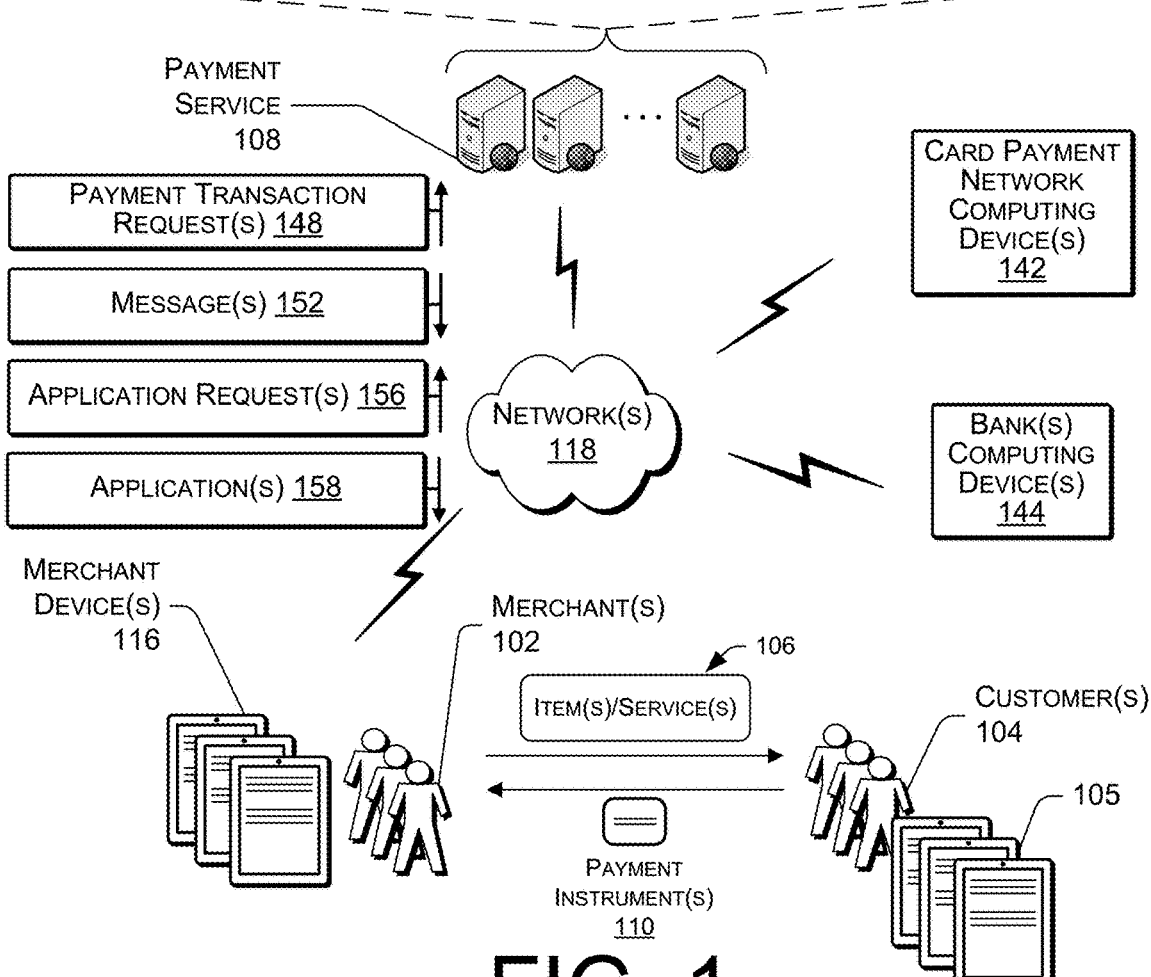

Currently, customer authentication using challenge query(s) is typically performed at the merchant. The merchant asks the customer for identification such as a driver's license before allowing a purchase transaction with a portable customer device to proceed. In some cases, it may be better to provide for more "back end" customer authentication processes, whereby a payment processing service can verify the identity of the customer. The payment processing service may have much more data about the customer than the merchant and is in a better position to authenticate the customer. For example, the issuer has information such as the customer's address, mother's maiden name, etc. In addition, the payment processing service has information such as recent purchase information and customer purchasing behavior. Any of this information can be used to help authenticate the customer in a purchase transaction despite a relatively high-risk assessment. Thus, in some embodiments, the payment processing service, the issuer, or any other non-merchant entity with information about the customer may pose challenge questions to the customer to authenticate the customer. The challenge questions may be static where the same questions are asked for each purchase transaction or dynamic where different questions may be asked over time.

The customer may use the portable customer device to interact with an access device such as a point of sale terminal and initiate the process. The point of sale (POS) terminal may initiate and then generate an authorization request message, which may thereafter be sent to a payment processing network, without explicit approval from the issuer. When the authorization request message is received, by the payment processing network, it is analyzed. A challenge message, which can be dynamic or semi-dynamic in nature, is then generated, and is sent to the customer. The challenge message could be sent back to the access device, or to the customer's portable customer device (e.g., if the portable customer device is a mobile phone).

The customer then provides a response to the challenge message. The challenge response message is received from the customer. The challenge response message is then verified and if it is verified, the authorization response message is analyzed to determine if the transaction is authorized (e.g., there are sufficient funds in the customer's account or there is sufficient credit in the customer's account). If the transaction is authorized, the payment processing network send an authorization response message to the customer. The authorization response message indicates whether or not the transaction is authorized. In some embodiments, such challenge questions are presented when the risk level associated with the transactions exceeds a certain threshold, and thus the transactions are approved (should the customer answer correctly) questions despite the initial risk assessment.

In the specific embodiments described above and below, challenge questions are described in detail, but embodiments of the invention are not limited thereto. Embodiments of the invention can generally relate to the use of challenge messages, which may include challenge questions. In some embodiments, as will be described in further detail below, challenge messages may or may not be read by a customer, and may challenge the authenticity of the customer in direct or indirect ways. Examples of challenge questions include questions relating to the customer's portable customer device (e.g., what is the CVV2 or card verification value on the back of your card?), the customer's location (e.g., what is your zip code?), the customer's mobile or regular phone (e.g., what is your mobile phone number?), the customer's personal information (e.g., what is your mother's maiden name?), etc. Examples of challenge messages that are not query(s) that are specifically answered by the customer include messages, which automatically query a phone as to its location or phone number, and cause the retrieval of such information. Another example of a challenge message may be a message, which supplies a code (or other authentication token) to a phone, and the use of that code at an access device authenticates the user. Furthermore, the challenge questions can be presented to the merchant or customer, or sender or recipient of funds as the case may be.

In some implementations, the challenge query(s) can also be described in the context of a sender-recipient environment where the sender is sending electronic cash to the recipient but unsure whether the recipient is the correct one. Such challenge query(s) may be sent to a specific set of recipients, for example in cases where the sender has never interacted with the recipient before, the amount being sent exceeds a threshold amount, or the identity of the recipient substantially matches identity of another in the sender's contact list or interaction history.

This disclosure thus describes, in part, techniques for analyzing payment transactions associated with a customer or a payment instrument and presenting customized query(s) or queries, based on the payment transactions, to the customer for authenticating identity of the customer and/or authorizing payment transactions based on the confirmed identity. The disclosed techniques integrate data and functionalities across multiple instances of payment applications executing on multiple point-of-sale (POS) devices. In some instances, a payment service may offer a variety of services to help merchants (also referred to as "entity" for a single merchant or "entities" for more than one merchant) secure payment transactions by reducing the possibility of fraud. For instance, the payment service may provide tools to enable merchants to generate customized queries as a method of authentication. As an example, the payment service may provide tools for maintaining a catalog (i.e., catalog data structures) and/or an inventory (i.e., inventory data structures) and track purchases made by the customers at one or more locations. A tool for tracking purchases may enable a merchant to access and manage a database storing itemization data associated with items (and/or data associated with services) that the customer has acquired over time from a list of available items (i.e., a catalog), and other details related to the transaction, such as time of the transaction, the total ticket size, and method of verification method (signature, PIN, biometric, etc.) provided by the customer. In at least one example, as described below, the itemization data may include a plurality of data items and a data item of the plurality of data items may represent an item that the merchant has provided for acquisition by the customer.

The data item may identify (e.g., provide indication of) the item and may be associated with additional data that represents information about the item or a payment transaction. For instance, the additional data may include attribute(s) of the item, a price of the item, a discount available for the item, taxes applicable to the item, a location of the item (e.g., where the item is located in a warehouse), image(s) of the item, the rest of the items on payment transaction, etc. In at least one example, attribute(s) may correspond to variants of the item and may be represented by attribute values. The itemization data may have item descriptions set at an earlier time by a catalog creator, that may specify attribute names and allowed values for each of the attributes, dependent on the actual characteristics of an item. For instance, attribute names may include "color" and "size" and attribute values may include "red" or "green" or "small," "medium," or "large," for each attribute name, respectively.

The payment service may provide various access points to a merchant so that the merchant can access and manage the merchant's catalog. As the merchant selects items from the catalog against a payment transaction and receives a payment instrument in response to the payment transaction, the payment service compares Additionally, for the purpose of the creating customized queries, the itemization data from other merchants where the customer may have used the same or associated payment instruments may be useful to create transaction-specific queries.

Additionally, or alternatively, the payment service may provide a merchant with a tool for managing its inventory or appointments. That is, the payment service may provide inventory tracking and reporting and customer appointments via such a tool. A tool for managing inventory may enable a merchant to access and manage a database storing data associated with a quantity of each item that the merchant has available (i.e., an inventory). The appointments aspect will indicate to the merchant the appointments the customer has made with the merchant or other merchants to aid in drafting of customized or dynamic query(s).

The payment service may provide various access points to a merchant so that the merchant can generate the challenge query(s). In some instances, the payment service may analyze and update itemization data associated with customers. To analyze and update the data, in some instances, the payment service may provide a customer with a new query based on updated information every single time and after each payment transaction initiated by the customer on associated payment instrument.

For instance, the payment service may determine a type of business (e.g., classification) associated with the merchant. In some examples, the type of business may include retail, restaurant, services, or the like. In some examples, the type of business may be more specific to the merchant. For instance, the payment service may determine the type of business associated with the merchant using a merchant category code (MCC) (and/or some other type of identifier) associated with the merchant.

The payment service can then identify one or more other merchants that are also associated with the type of business. For instance, the payment service may store, for each merchant, information describing the type of business the respective merchant is associated with. In some instances, the payment service stores the information in a merchant profile associated with the respective merchant. The payment service can then use the merchant profiles to identify the one or more other merchants that are also associated with the type of business.

After identifying the one or more other merchants, the payment service can use customer transaction history for customer behavior and in general, shopping trends associated with the one or more other merchants to generate and provide query(s) for the customer to answer as authentication means. For instance, the payment service can utilize one or more algorithms to analyze customer transaction history across the board or associated with certain merchants or merchants selling certain items. The one or more algorithms may analyze data (e.g., the data items and/or data services) associated with each of the invoices or receipts at merchants in order to identify items (and/or similarly services) associated with the current transaction. Using the analysis, the payment service can detect commonalities between the current customer behavior and past customer behavior, either at the merchants' respective physical establishments, at the merchants' online marketplaces, and/or both.

The payment service can then use the commonalities or common trends to generate challenge query(s) to present on the POS device or customer device. In some instances, the payment service may generate challenge query(s) based on data associated with the other merchants. In some instances, the payment service may use geographical locations of the other merchants when generating a challenge query(s). For instance, the payment service may generate query(s) pertaining to merchants that are proximate to the merchant (e.g., within a block, mile, etc.) from the current merchant location, or pertaining to transactions occurring within a particular time window (e.g., trends detected in the past week).

In some instances, the payment service may generate one or more of the challenge query(s) based on transaction information. For instance, the payment service may store transaction information associated with transactions conducted between merchants and customers. The transaction information for a respective transaction can indicate an identifier of the merchant, an identifier (e.g., name) of the customer, payment information associated with a payment instrument used by the customer during the respective transaction, item(s)/service(s) acquired by the customer during the respective transaction, a cost of the item(s)/service(s) acquired by the customer during the respective transaction, a time, place and date of the respective transaction, and so forth.

To generate one or more query(s) based on the transaction information, the payment service can analyze the transaction information using one or more algorithms that identify which of the identified items includes sales data that is greater than a threshold. In some instances, the threshold can correspond to a number of items (e.g., quantity) acquired by customers during respective transactions. For instance, the threshold can include ten items, fifty items, one hundred items, or the like. In some instances, the threshold can correspond to a number of items (e.g., quantity) acquired by customers during a respective time period. For instance, the threshold can include ten items per week, one hundred items per month, or the like. The payment service can then determine to generate query(s) should the transaction include the identified items that exceed the threshold.

Additionally to, or alternatively from, using the threshold, the payment service can utilize correlations between items in order to generate query(s). In addition to analyzing nature of items (and/or services), the payment service can generate query(s) should the quantities of items exceed a general number of items, where the general number is based on past customer behavior. All such factors, also referred to as query factors, may be taken into account by the payment service to generate the query(s) that either statically or dynamically relates to the customer's transaction. The payment service can then generate one or more messages for the merchant that generate challenge query(s) based on the nature of transaction, such as the total transaction amount or the quantity of the item. For example, the query can be "when was the last time you bought 20 donuts?" or "how often do you order custom coffee?" or "what do you usually order on weekdays at the coffee place at the corner of Market and Van Ness?"

The payment service can then send the message to a POS device associated with the merchant if the customer answers correctly or substantially correctly performing an action, for example approving a transaction or reducing the risk level or other such follow-up action. For example, the customer may say "Weekdays" instead of "Monday to Friday." If the customer does not answer the question correctly, a further follow-up action may be performed, such as the customer may be asked to provide a secondary form of authentication, payment instrument or denied the transaction. Additionally, in both cases, the transaction and customer behavior, including customer input, may be saved for future interactions or for generation of new rules.

In some instances, the payment service may further integrate functionality across multiple applications in order to provide merchants with applications that are customized for each respective merchant. For instance, the payment service may store multiple applications that merchants can use to conduct transactions with customers. In some instances, each application may be associated with a type of business. For example, the payment service may store a first application that is associated with retail merchants (e.g., merchants that sell items, such as clothes, groceries, sporting equipment, etc.), a second application that is associated with merchants that provide services (e.g., mechanics, doctors, cleaning services, etc.), and a third application that is associated with restaurant merchants (e.g., restaurants, bars, etc.).

For instance, the payment service may generate customized applications using a rule engine that includes the code for each business. In other words, a specific set of questions may apply to each business and each such set of static questions may be stored in a code. For example, each of the retail application, services application, and restaurant application may be built using a respective code that provides the respective application with the functionality described above. For instance, the retail application may be built using first code that provides the retail application with the functionality required by retail merchants to conduct transactions, the services application may be built using a second code that provides the services application with the functionality required by merchants that provide services during transactions, and the restaurant application may be built using a third code that provides the restaurant application with the functionality required by restaurant merchants to conduct transactions.

The payment service can then generate customized applications using the rule engine. For example, the payment service can generate a customized retail application that includes at least some of the first code from the retail application and at least some of the second code from the services application. For another example, the payment service can generate a customized retail application that includes at least some of the first code from the retail application, at least some of the second code from the services application, and at least some of the third code from the restaurant application. The payment service can perform similar processes for generating customized services applications and customized restaurant applications.

The customized retail application can include functionality that causes a POS device to operate in two or more modes of operation, where each mode of operation is associated with a type of business. For instance, and using the example above where the payment service generates a customized retail application that includes at least some of the first code from the retail application, at least some of the second code from the services application, and at least some of the third code from the restaurant application, the POS device can execute the customized retail application during a transaction between a merchant and a customer.

During execution of the customized retail application, the POS device may initially operate in a first mode of operation that is associated with retail since the customized application is a "retail application." While operating in the first mode of operation, the POS device may provide a retail user interface that includes one or more input options for inputting information describing items that the customer is acquiring from the merchant during the transaction. The POS device may receive the input via the retail user interface, and then update the retail user interface to indicate each of the items being acquired by the customer during the transaction. In some instances, after receiving the input, the POS device may attempt to authorize the transaction for a cost of the items. However, in some instances, the customer may further acquire services from the merchant during the transaction.

For instance, the POS may then receive input associated with transitioning from the first mode of operation to a second mode of operation, which may be associated with services. In some instances, the input may include a selection of a graphical icon provided by the retail user interface. Based on receiving the input, the POS device may transition from operating in the first mode of operation to operating in the second mode of operation. While operating in the second mode of operation, the POS device may provide a services user interface that includes one or more input options for inputting information describing services that the customer is acquiring from the merchant. The POS device may receive the input via the services user interface, and then update the services user interface to indicate each of the services being acquired by the customer during the transaction.

Advantages of the described technology includes, for example, authentication of the customer, or a sender or recipient in case a fraudulent party gets access to the true owner's payment instrument or payment proxy or even devices executing payment applications. Furthermore, as per preferences set by the parties, the challenge questions may be triggered for specific people, time, or location.

Although above describes integrating functionality across multiple applications that are associated with types of business that include retail, services, and restaurants, the above techniques can be used to integrate functionality across applications that are associated with other types of business. For instance, the payment service may provide applications that are associated with various MCCs. The payment service can then use the techniques described above to generate customized applications using a rule engine that includes code from each of MCC specific applications.

By using the techniques described above, the payment service is capable expanding the functionality of a POS device or a customer device and generating an authentication method that is unique to the customer, is dynamic as it changes with the nature of transaction, and is secure as it is based, in part, on a behavior analysis of the customer transaction history at the current or any merchant location, over time. For instance, the POS device or customer device can download and execute a customized application that provides the POS with a mode of operation for receiving a challenge question and providing an answer to the challenge question. The customized application can also provide the POS device with functionality that is specific to a first type of business, such as retail, by causing the POS device to provide a user interface for inputting information associated with items that the merchant offers. Additionally, the customized application can provide the POS device with functionality that is specific to a second type of business, such as services, by causing the POS device to provide a user interface for inputting information associated with services that the merchant offers.

The implementations described herein can also be applied in scenarios where cash is transferred between a sender and a recipient, and additional verification may be requested by either or both parties to validate the transfer. Technology is disclosed for simplifying a transfer of cash (i.e., money) between a sender and a recipient by use of a tagging mechanism ("the cash tag technology"). As used here, the term "tagging" refers to a marking of an alphanumeric character (or a string of alphanumeric characters) to identify it (i.e., the character or string) for treatment in a specified way. The term "alphanumeric character" as used here refers to a symbol that can be a number (i.e., numeric), a letter (i.e., alphabetic), or a combination thereof. Briefly described, the cash tag technology enables a sender, who desires to send cash to a recipient, to trigger a money transfer by specifying, in any communication message, an amount and a recipient using one or more inputs having a particular syntax. The syntax includes a monetary currency indicator (or "currency indicator") prefixing one or more alphanumeric characters. The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies, e.g., dollar ($), euro (€), pound (£), rupee (₹), yuan (¥), etc. Although use of the dollar currency indicator ($) is used herein, it is to be understood that any currency symbol could equally be used.

Today, money transferring solutions typically require some form of registration by both parties involved in the transaction (i.e., a sender and a recipient of the payment) before the payment transfer can occur. The registration generally includes an account creation process and a login verification process. In particular, a sender must (a) enter various account information, e.g., name, address, email address, etc., to create an account with a particular payment service, and (b) wait for a verification email to verify the sender's identity associated with the newly created account, for example, by clicking on a web address included in the verification email to enter various authentication credentials, e.g., login name, password, etc. Some existing solutions also require verification of the banking institution(s) linked to the account, e.g., verify authentication amount deposited in the sender's bank account. Furthermore, to transfer money to the recipient, the sender generally must know at least some financial account information of, or other identifier for, the recipient, e.g., a bank account number, a routing number, a telephone number, an email address, etc. Also, the conventional money transfer solutions do not validate the recipient's identity and so if the sender inadvertently enters the wrong information, it is possible that a wrong recipient receives the money.

In contrast, the cash tag technology introduced here provides efficient execution of financial transactions (e.g., payment transfers) by enabling a sender to trigger a money transfer through the use of the syntax in any communication message in a messaging application, forum or via a landing page, and further authenticate the recipient, for example if a risk level is reached. Conventional solutions may reject the requests in case a high risk is associated with the transaction, however, the disclosed implementations allow for validation of recipient despite the risk assessment. The payment service sends challenge questions to the recipient to confirm whether or not the recipient knows the answers to the questions. If the recipient device is in the wrong hands or the recipient is a wrong recipient, the payment service will deny the transaction on the basis of wrong responses to the challenge questions.

Operationally, the sender can specify, in a communication message, an amount of money to transfer by including an input having the syntax, where the input can include the monetary indicator and one or more numeric characters (e.g., $10). In some instances, the sender can also specify, in the communication message, the recipient to whom the sender intends to send the money by including another input having the syntax. The input can include the monetary indicator and one or more alphabetic and/or numeric characters (e.g., $alex or $alex123). Such input identifying the recipient is referred to as a "payment proxy" in this description, as shorthand.

A computer system, upon receiving indication of the sender's desire for money transfer (i.e., as indicated by the input(s) having the syntax), initiates the money transfer on behalf of the sender (i.e., executes, or causes to be executed, one or more operations to transfer funds between the appropriate accounts). The transfer can be initiated irrespective of the financial institution with which the sender or the recipient is associated. For example, the cash can be transferred even though the sender may have a financial account associated with Bank A while the recipient may have a financial account associated with Bank B. Furthermore, the computer system can initiate the transfer regardless of the bank-acquirer-financial institution structure associated with the recipient. Once the payment proxy is provided, the computer system can identify the associations and establish the communication links to initiate the transfer. Additionally, the computer system executes, or causes to be executed, the transfer in such a way that neither the sender nor the recipient is privy to sensitive information about each other. In particular, the computer system can encrypt financial information and any other personal identifying information (e.g., email addresses, phone numbers, usernames, payment proxies, etc.), thereby securing payment transaction(s) between the sender and the recipient and keeping all information "hidden" from the respective parties. The computer system can also shield such information from financial institutions (e.g., banks) that may otherwise target products and/or services using any known information of the parties (e.g., personal identifying information).

In certain cases, if the payment service detects high-risk level with the transaction or based on settings or preferences of the sender and recipient, the payment service may generate challenge questions for the sender and/or recipient. The challenge questions are based on their transaction history and may be drafted based on a behavior or trend analysis of the transactions. If the recipient fails to answer the question correctly, the transfer is not consummated.

As will be discussed in greater detail below, each user interface includes various input options for inputting information associated with the type of business. For instance, the user interface associated with retail may include input options that the merchant can use to input an answer associated with an identity of an item, a quantity for the item, physical properties of the item (e.g., size, color, etc.), or the like. The user interface associated with services may include input options that the merchant can use to input an identity of the service, an appointment time for the service, notes specific to how the service is to performed, or the like. Furthermore, a user interface associated with restaurants may include input options that the merchant can use to input an identity of a menu item, a quantity for the menu item, notes on how to prepare the menu item, sides to include with the menu item, or the like.

It should be noted that, as described herein, messages can include any type of electronic communication that electronic devices can send and receive with other electronic devices. For instance, a message can include an email message, a short message service (SMS), multimedia messages (MMS), a voicemail message, an audio signal, or any other type of electronic communication that an electronic device can send to another electronic device. In some instances, an electronic device may use messages to send indications, notifications, alerts, and/or requests to another electronic device.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

Various embodiments and implementations of the disclosed custom and/or dynamic authentication technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by buyers. Actions attributed to a merchant may include actions performed by owners, merchants, or other agents of the merchant and thus no distinction is made herein unless specifically discussed. In addition, as used herein, a buyer or customer or user may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires an item from a merchant, and in return, the buyer provides payment to the merchant, for example through a payment instrument issued by an issuing entity.

As used herein, a 'payment transaction' or simply 'transaction' may include a financial transaction for the acquisition of goods and/or services that is conducted between a buyer and a merchant. For example, when paying for a transaction, the buyer can provide the amount that is due to the merchant using a payment instrument or a payment proxy for the payment instrument. In other cases, the payment transaction includes transfer of money from one party to another for any number of reasons. Thus, while the description refers to as buyer and merchant as parties to the payment transaction, it will be understood that the parties can be a sender and a recipient, a land lord and a renter, a bank and a bank customer, a first friend and a second friend, and so on.

The term 'payment card,' payment instrument,' or 'payment object' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or merchant's financial account. The payment proxy can be used in the context of and within a webpage as part of the web address, a social networking handle or username, a forum, a messaging application, and so on.

The term 'biometric payment instrument' is a type of payment object or financial instrument that is biometrically identifiable and initialized by a biometric characteristic, such as a person's finger (e.g., for fingerprint recognition), face, iris or retina, heartbeat, voice, etc. Accordingly, the CVM can include a PIN, signature, or a biometric input, such as a fingerprint or iris scan.

The payment object reader may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment object. Accordingly, the payment object reader may include hardware implementation, such as slots, magnetic tracks, and rails with one or more sensors or electrical contacts to facilitate detection and acceptance of a payment object. Additionally or optionally, the payment object reader may also include a biometric sensor to receive and process biometric characteristics and process them as payment instruments, given that such biometric characteristics are registered with the payment processing system and connected to a financial account.

In one example, the POS terminal can be a hand-held device such as a mobile phone, laptop, tablet computer, and the like, associated with a merchant. In another example, the POS terminal is a mobile device that is wearable or otherwise connected to or associated with the buyer or merchant, for example, the computing device may be an Apple® watch or a Fitbit®.

As used herein, the term 'payment application' or 'financial application' includes any application configured for management of payment transactions connected to a payment instrument or multiple payment instruments issued by a single entity or multiple entities to a user. The financial application can also provide the user with financial information, option to open an account with the issuing entity, dispense physical cash, transfer cash electronically, pay bills, apply for loans, make deposits, obtain assistance from the agent, monitor spending habits, get financial advice, set spending goals, manage transaction and spending limits, and the like. The term "payment application" as used here, can also refer to or include any messaging application that enables communication between users (e.g., sender and recipient of a message) over a wired or wireless communications network, or devices, for example between an issuing entity and the user's communication device. A payment processing system that delivers a communication service to users, e.g., chat capability, can employ the messaging application. The messaging application can include, for example, a text messaging application for communication between phones (e.g., conventional mobile telephones or smartphones), or a cross-platform instant messaging application for smartphones and phones that use the Internet for communication. The message can also be to confirm the location of the user or obtain an approval to extract location of the user. Although this specification may employ text messages as an example, it is to be understood that the technology may employ any of these types of messages. Upon receiving an indication to send (e.g., after detecting that the user has clicked "Send"), the messaging application transmits a message, e.g., the text message to a messaging application computer system ("messaging application system").

As used here, the term "pairing" or "associating" refers to a process in which the POS terminal and the payment object reader establish a communication channel with each other using wireless communication protocols, for example, Bluetooth®, Bluetooth Low Energy®, Wi-Fi®, etc. The POS terminal and the payment object reader each includes a transceiver capable of transmitting data between them once "paired." The pairing technology described herein can pair a payment object reader to the POS terminal in both real-time and offline modes. Furthermore, even though Bluetooth or Bluetooth Low Energy has been used to describe certain embodiments, other wireless protocols, such as NFC, Wi-Fi, etc., can also be used.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi and cellular communication technologies like worldwide interoperability for microwave access (Wi-MAX), 3G, 4G, CDMA, digital subscriber line (DSL), etc., cloud computing technologies, as well as wired or fiber optic technologies. Additionally or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

The term "swipe" here refers to any manner of triggering a payment object reader to read data from a payment object, such as by dipping into, tapping, hovering, bringing in close contact or passing the payment object into or through a payment object reader.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

While certain devices, e.g., the payment object readers and POS terminals are shown as including distinct components, this is merely for ease of illustration and not intended as limiting. In various implementations, the payment object readers and POS terminals may be identical, similar or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the figures, FIG. 1 illustrates an example environment 100 that includes merchant(s) 102-1, . . . N (collectively referred to as merchants 102) conducting transactions with customer(s) 104-1, . . . N (collectively referred to as customers 104) for item(s)/service(s) 106, as well as a payment service 108 to authorize payment instrument(s) 110-1, . . . N (collectively referred to as payment instruments 110) of the customer(s) 104 for the transactions. The customers 104 may also be associated with customer devices 105-1, . . . N (105), which may operate as payment instruments 110 or may have instances of payment applications 114 executing thereon. The instances of payment applications 114 may also be executing on the merchant devices 116-1, . . . N (collectively referred to as merchant devices 116). The devices 105 and 116 may be configured to respond to requests from other devices, such as the other to provide its exact location, approximate location, or location relative to another device. In some implementations, the device 105 may allow other devices to check whether or not the device 105 is within a marked geo-fence.

The payment application 114 can include an interface for the user to select the payment instrument 110 or otherwise track transactions made through the payment instrument 110. In one implementation, multiple payment instruments 116, issued by the same or different issuing entity, can be accessed by a single payment application 114. In some implementations, the payment application 114 can be an instance of the payment instrument, for example a virtual wallet. When the payment application, for example a web or mobile application, is installed on the device 105 or 116, for example by accessing a download feature followed by an optional registration process, the payment application 114 may be associated with the payment instrument 110, the device or its identifier, and the entity that has issued the payment instrument, for example, issuer 144, through the process of registration. The registration process may also trigger the user to allow the issuer 144 to obtain and store the device information (e.g., device identifier), environment information (e.g., location of the point of transaction, location of device, or location of the payment instrument, etc.), or the user information (location of the user, user identifier, etc.) indicative of the device 116 or 105 after explicit approval from the merchant or the customer respectively. FIG. 1 further illustrates that the payment service 108 analyzes and updates data corresponding to transactions associated with a customers occurring at stores of the merchant(s) 102. Furthermore, FIG. 1 illustrates that the payment service 108 generating and/or providing application(s) 114 for the merchant(s) 102 to utilize during the transactions to present customized queries, based at least on a nature or history of transactions associated with the customers. If the customer provides a correct answer to the customized queries, the payment service or the merchant device performs another action. Actions may include, but are not limited to, processing the payment transaction, generating a secondary form of authentication, saving details of the current payment transaction to the central database, adding comments or exception flags to specific payment transactions, and the like.

As used herein, merchant device(s) 116 may comprise any sort of mobile or non-mobile devices (e.g., electronic device(s)) that include instances of application(s) 114 that executes on the respective devices. The application(s) 114 may provide POS functionality to the merchant device(s) 116 to enable merchant(s) 102 (e.g., owners, employees, etc.) to at least accept payments from the customer(s) 104. In some types of businesses, the merchant device(s) 116 may correspond to a store or other place of business of the merchants, and thus, may be a fixed location that typically does not change on a day-to-day basis. In other types of businesses, however, the location of the merchant device(s) 116 may change from time to time, such as in the case that the merchant(s) 102 operate a food truck, is a street vendor, is a cab driver, etc., or has an otherwise mobile business, e.g., in the case the merchant(s) 102 sell items at buyer's homes, places of business, and so forth. In either of the examples above, the place of business of the merchant(s) 102 may be referred to a physical establishment. As mentioned before, in some cases, the applications 114 may also execute on the customer devices 105, for example as web applications or as user interfaces. The user interface may indicate one or more customized queries for the customer to respond. The answers may be in the form of multiple choices. In some other cases, a textual field may be provided to allow the customer to enter the answer. The entered answer may be analyzed based on natural language engines to determine all possible variations before making comparison with the system-generated answer. Also, the interface may provide a finite number of chances for the customer or merchant to skip a customized query and move on to the next query, such that the skipped query is not asked again, in one example.

Additionally, as used herein, a merchant 102 (also referred to as an "entity") may include any business engaged in the offering of items (e.g., goods) or services for acquisition by customer(s) 104. Actions attributed to a merchant 102 may include actions performed by owners, employees, or other agents of the merchant 102, and thus no distinction is made herein unless specifically discussed. In addition, as used herein, a customer 104 may include any entity that acquires items or services from a merchant 102, such as by purchasing, renting, leasing, borrowing, licensing, or the like. Hereinafter, items and/or services offered by merchants 102 may be referred to solely as items. Thus, a merchant 102 and a customer 104 may interact with each other to conduct a transaction in which the customer 104 acquires an item from a merchant 102, and in return, the customer 104 provides payment to the merchant 102.

As used herein, a transaction may include a financial transaction for the acquisition of items and/or services that is conducted between customer(s) 104 and merchant(s) 102. For example, when paying for a transaction, the customer 104 can provide the amount that is due to the merchant 102 using cash or other payment instrument 110 (e.g., a debit card, a credit card, a stored-value or gift card, a check, through an electronic payment application on a device carried by the customer 104, or the like). The merchant 102 can interact with the merchant device(s) 116 to process the transaction, such as by inputting (e.g., manually, using a magnetic card reader or an RFID reader, etc.) identifiers (e.g., payment information, such as a card number, account number, or any other account information) associated with the payment instrument 110. For example, a payment instrument 110 of the customer 104 may include one or more magnetic strips for providing card and customer information when swiped in a card reader. In other examples, the payment instrument 110 may include other types of payment cards may be used, such as smart cards having a built-in memory chip that is read by the device when the card is "dipped" into the reader, a radiofrequency identification tag, or so forth.

During a transaction between a merchant 102 and a customer 104, the merchant device(s) 116 can determine transaction information describing the transaction, such as the payment information of the payment instrument 110, an amount of payment received from the customer 104, the item(s)/service(s) 106 acquired by the customer 104, a time, place and date of the transaction, other attributes of the item, payment instrument, or payment transaction, a card network associated with the payment instrument 110, an issuing bank of the payment instrument 110, a name of the customer 104, and so forth. The merchant device(s) 116 can send the transaction information to the payment service 108 over a network 118, either substantially contemporaneously with the conducting of the transaction (in the case of online transactions) or later when the device is in the online mode (in the case offline transactions).

The payment service 108 may include one or more processors 120 and memory 122, which may store an operating system 124, a payment processing component 126, a catalog management component 128, a query generation component 130, an itemization analysis component 132, a transaction analysis component 134, an applications component 136, transaction information 138, and database(s) 140. The payment processing component 126 may function to receive the information regarding the transaction from the merchant device(s) 116 and attempt to authorize the payment instrument 110 used to conduct the transaction. The payment processing component 126 may then send an indication of whether the payment instrument 110 has been approved or declined back to the merchant device(s) 116.

Generally, when a customer 104 and a merchant 102 enter into an electronic payment transaction, the transaction is processed by electronically transferring funds from a financial account associated with the customer 104 to a financial account associated with the merchant 102. As such, the payment processing component 126 may communicate with one or more computing devices of a card network (or "card payment network") 142, e.g., MasterCard®, VISA®, over the network 118 to conduct financial transactions electronically. The payment processing component 126 can also communicate with one or more computing devices of one or more banks 144, processing/acquiring services, or the like over the network 118. For example, the payment processing component 126 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instrument(s) 110 to customer(s) 104, and may pay acquiring banks for purchases made by customer(s) 104 to which the issuing bank has issued the payment instrument(s) 110. Accordingly, in some examples, the computing device(s) of an acquiring bank may be included in the card payment network and may communicate with the computing devices of a card-issuing bank to obtain payment. Further, in some examples, a customer 104 may use a debit card instead of a credit card, in which case, the bank computing device(s) of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In the example environment 100 of FIG. 1, the payment service 108 may manage catalog(s) and inventory(s) 146 for merchant(s) 102. For instance, the catalog management component 128 may manage catalog(s) 146 stored in the database(s) 140. That is, in at least one example, the catalog management component 128 may receive instructions (e.g., purchase transaction request(s) 148) associated with modifying catalog(s) 146 and may update catalog(s) 146 based on the instructions. For instance, a merchant device 116 may send instructions to the payment service 108 which may identify a modification that is to be made to a catalog 146 associated with a merchant 102. As a result, the catalog management component 128 may modify the catalog 146 consistent with the instructions. In some examples, the instructions may be received from devices associated with merchants (e.g., merchant device(s) 116). In other examples, the instructions may be received from third-party sources or systems.

Additionally, the catalog management component 128 may manage catalog and inventory(s) 146 stored in the database(s) 140. That is, in at least one example, the catalog management component 128 may receive instructions (e.g., payment transaction request(s) 148) associated with modifying inventory(s) 146 and may update respective inventory(s) 146 based on the instructions. For instance, a merchant device 116 may send instructions to the payment service 108 which may identify a modification that is to be made to an inventory 146 associated with a merchant 102. As a result, the catalog management component 128 may modify the inventory 146 consistent with the instructions. In some examples, the instructions may be received from devices associated with merchants (e.g., merchant device(s) 116). In other examples, the instructions may be received from third-party sources or systems. As such, the payment service 108 may further analyze and update data within catalog(s) 146 associated with merchant(s) 102.

In the example of FIG. 1, the payment service 108 may further analyze and update payment transaction requests 148 and items being purchased by the customer, for example, for the purpose of assessing risk associated with the payment transaction, and accordingly implement a method of authentication described herein. In one implementation, the payment service 108 (also referred to as PSS 108 herein) detects a level of risk based on a first predictive model that has been previously generated using machine learning techniques based on historical training data (not shown). The historical training data may comprise different types of information about merchants and about customers who have purchased from the merchants. For example, the historical training data may include transaction data corresponding to multiple historical transactions conducted by multiple merchants with multiple customers using the transaction service 108 and/or other services. Transaction data may include details regarding individual transactions and transaction requests, including items purchased, amounts, times and dates, merchant and customer identities, locations of transactions, delivery destinations for purchases, and various other aspects of individual transactions. In addition, for each historical transaction the historical training data may indicate whether the transaction was ultimately determined to be a fraudulent transaction.

An action which is part of the analysis phase, comprises analyzing current transaction data and various merchant data using the first predictive model to determine a probability P1, referred to herein as a fraud probability, that the transaction represented by the current transaction data is risky and the level of risk. The current transaction data, which corresponds to a current transaction being conducted between a merchant and a customer, may include many types of information, including data received from the merchant contemporaneously with conducting the current transaction. For example, the current transaction data may include line-item details regarding a purchase, such as the items being purchased and the prices being charged for the items. The current transaction data 206 may include the addresses and/or current locations of the merchant and the customer, the IP address from which the merchant is communicating, the time-of-day of the purchase transaction, the identity of the purchaser, delivery or shipping addresses for items of the transaction, various information stored in cookies on a merchant device, details regarding a payment instrument being used by the purchaser to conduct the transaction, specification of a merchant account into which funds are to be transferred, an identity of a merchant employee who is conducting the current transaction, and so forth.

The merchant data may include historical transaction data corresponding to previous transactions conducted by the merchant with various customers. For each of multiple historical purchase transaction, the historical transaction data may include information similar to that mentioned above with respect to the current transaction data 138. In addition, the merchant data (stored in profiles 150) may indicate other information about the merchant, such as the type of business conducted by the merchant. For example, the merchant data may indicate that the merchant is a barber, a car dealership, an online retailer, a mobile food truck, or some other category of business. The merchant data may include various other attributes and/or characteristics of the merchant, such as the merchant's street address, bank accounts and other financial information relating to the merchant, historical revenues of the merchant, credit ratings of the merchant, and so forth.

An action comprises determining whether the current transaction is a suspect transaction. That is, action comprises declaring, based at least in part on the fraud probability P1, whether the current transaction should be classified as suspect. Specific techniques for performing the action will be described below.

If the current transaction is not declared suspect in the action, the transaction is allowed to proceed. That is, the payment service 108 processes the transaction and initiates transfer of the requested funds from the customer account to the merchant account.

However, if the transaction is determined to have a risk level higher than a threshold value, the customer is presented with PSS 108 generated challenge query(s) 113, the responses of which are validated by the PSS after receiving them from the customer.

To this end, the itemization analysis component 132 of the payment service 108 may determine a type of business associated with an item offered by the first merchant 102. In some examples, the type of business may include retail merchant, restaurant merchant, a services merchant (e.g., merchant that provides services), or the like. This may be helpful in extracting challenge query(s) 113 specific to the type of business. In some examples, the type of business may be more specific to the first merchant 102. For instance, the catalog management component 128 may determine the type of business associated with the first merchant 102 using a MCC and/or other type of code that defines the first merchant's 102 business. Still, in some examples, the type of business may be based on specific items/services offered for acquisition by the first merchant 102. For instance, if the first merchant 102 offers sporting equipment for acquisition, the type of business may be a sporting equipment retailer.

The itemization analysis component 132 can then identify one or more second merchant(s) 102 that are also associated with the type of business. For instance, the payment service 108 may store, for each merchant 102, information describing the type of business the respective merchant 102 is associated with. In some instances, the payment service 108 stores the information in profile(s) 150 associated with the merchant(s) 102. The itemization analysis component 132 can then analyze the profiles(s) 150 to identify the one or more second merchant(s) 102 that are also associated with the type of business.

In a similar manner, the itemization analysis component 132 and the transaction analysis component 134 identify previous transactions similar to the current payment transactions, for example based on the itemization data 112. Optionally or additionally, a payment processing component 126 can determine a level of risk associated with the transactions. Thus, as described above, the predictive models can be implemented by the component 126.

If the risk is high, the query generation component 130 generates challenge query(s) 113 for the customer. In some instances, the payment service 108 may generate one or more query(s) 113 based on the identified items based data associated the one or more merchants 102. To generate challenge query(s) 113 based on the transaction information 138, the query generation component 130 can analyze the transaction information 138 using one or more algorithms that identify which of the identified items includes sales data that is greater than a threshold, and phrase query(s) 113 based on that. In some instances, the threshold can correspond to a number of items acquired by customer(s) 104 from the one or more second merchant(s) 102 during respective transactions. For instance, the threshold can include ten items, fifty items, one hundred items, or the like. In some instances, the threshold can correspond to a number of items acquired by customer(s) 104 from the one or more second merchant(s) 102 during a respective time period. For instance, the threshold can include ten items per week, one hundred items per month, or the like.

Additionally to, or alternatively from, using the threshold, query generation component 130 can utilize correlations between items in past orders to current order items.

After determining the query(s) 113 to generate to the first merchant 102 for the customer, the payment service 108 can generate and send message(s) 152 to the first merchant 102 that recommend that the first merchant 102 request the CVM to the customer. A merchant device 116 associated with the first merchant 102 can receive the message(s) 152 from the payment service 108 on application 114, provide (e.g., display) the question to the first merchant 102, receive input indicating that the customer, validate the response based on responses 117 and send an approval/denial accordingly.

In one implementation, the payment service 108 may generate application(s) 114 using one or more rule engine(s) 154 that include the code from each of the applications that is associated with a respective type of business. For example, and using the example above, each of the retail application 114, services application 114, and restaurant application 114 may be built using respective code that provides the respective application 114 with the functionality described above. For instance, the retail application 114 may be built using first code that provides the retail application 114 with the functionality required by retail merchants to conduct transactions, the services application 114 may be built using second code that provides the services application 114 with the functionality required by merchants that provide services to conduct transactions, and the restaurant application 114 may be built using third code that provides the restaurant application 114 with the functionality required by restaurant merchants to conduct transactions.

The application component 136 can generate a rule engine 154 using a factor based on itemization, and then use the rule engine 154 to generate customized queries 114 on applications 114. For example, and using the example above, the application component 136 can generate a customized retail application 114 that includes at least some of the first code from the retail application 114 and at least some of the second code from the services application 114. For another example, the applications component 136 can generate a customized retail application 114 that includes at least some of the first code from the retail application 114, at least some of the second code from the services application 114, and at least some of the third code from the restaurant application 114. The payment service 108 can perform similar processes for generating customized services application(s) 114 and/or customized restaurant application(s) 114 using the rule engines(s) 154.

The customized application 114 can then include functionality from at least two of the applications(s) 114 that were associated with the various types of business. For instance, the customized retail application 114 can include functionality that causes a merchant device 116 operate in two or more modes of operation, where each mode of operation is associated with a type of business (e.g., functionality from one of the original three applications 114). For instance, and using the example above where the application component 136 generates a customized retail application 114 that includes at least some of the first code from the retail application 114, at least some of the second code from the services application 114, and at least some of the third code from the restaurant application 114, the merchant device 116 can execute the customized retail application 114 during a transaction between a merchant 102 and a customer 104.

During execution of the customized retail application 114, the merchant device 116 may initially operate in a first mode of operation (e.g., primary mode of operation) that is associated with retail since the customized application 114 is a "retail application." While operating in the first mode of operation, the merchant device 116 may provide a retail user interface that includes the one or input options for inputting information describing items that the customer 104 is acquiring from the merchant 102 during the transaction. The merchant device 116 may receive the inputted information via the retail user interface, and update the retail user interface to indicate each of the items being acquired by the customer 104 during the transaction. In some instances, after receiving the inputted information, the merchant device 116 may attempt to authorize the transaction for a cost of the items. However, in some instances, the customer 104 may further acquire services from the merchant 102 during the transaction.

For instance, the merchant device 116 may receive input associated with transitioning from the first mode of operation to a second mode of operation, which may be associated with services. In some instances, the input may include a selection of a graphical icon provided by the retail user interface. In some instance, the input may include the merchant 102 inputting information into the merchant device 116 that is associated with a service, such as by scanning a barcode and/or other identifier associated with a service. Based on receiving the input, the merchant device 116 may transition from operating in the first mode of operation to operating in the second mode of operation. While operating in the second mode of operation, the merchant device 116 may provide a services user interface that includes one or more input options for inputting information describing services that the customer 104 is acquiring from the merchant 102. The merchant device 116 may receive the inputted information via the services user interface, and then update the services user interface to indicate each of the services being acquired by the customer during the transaction.

In the example, the merchant device 116 can perform a similar process to transition from operating in the second mode of operation to operating in a third mode of operation, which may be associated with restaurants. While operating in the third mode of operation, the merchant device 116 may provide a restaurant user interface that includes one or more input options for inputting information describing restaurant menu items that the customer 104 is acquiring from the merchant 102. The merchant device 116 may receive the inputted information via the restaurant user interface, and then update the restaurant user interface to indicate each of the restaurant menu items being acquired by the customer 104 during the transaction.

The example above describes that a primary mode operation for the customized retail application 114 is associated with a retail type of business. In some instances, this is because the primary business purpose for the customized retail application 114 is for retailer merchant(s) 102. For instance, retailer merchant(s) 102, whose primary business purpose is the selling of retail items, may access the payment service 108 to download the customized retail application 114 since the application 114 is customized for retail merchant(s) 102, i.e., the primary mode of operation includes the functionality associated with the retail application 114 described above.

In some instances, the application component 136 may generate and/or provide customized queries 114 for other types of business (e.g., services, restaurants, etc.). For instance, the application component 136 may generate a customized services application 114 using the same rule engine 154 as the customized retail application 114. However, the primary mode of operation for the customized services application 114 is for merchant(s) 102 that primarily offer services to customer(s) 104. For instance, when executing on a merchant device 116, the first mode of operation that the customized services application 114 operates in will include the mode of operation associated with the services application described above. For example, the merchant device 116 will provide a services user interface that includes the one or input options for inputting information describing services that a customer 104 is acquiring from a merchant 102 during a transaction.

In some instances, the merchant 102 may set the primary mode of operation for a customized application 114. For instance, the merchant 102 may use a merchant device 116 to download a customized application 114 that is built using a rule engine 154 that includes code from multiple applications 114, where each application is associated with a respective type of business. While executing the customized application 114, the merchant device 116 may receive input from the merchant 102 that indicates that the primary business purpose for the merchant 102 is one of the respective types of businesses. For instance, the input may indicate that the merchant 102 is primarily a retail merchant. Based on the input, the merchant device 116 may cause the customized application 114 to set the primary mode of operation based on the primary business purpose. For instance, the merchant device 116 may cause the customized application 114 to set the primary mode of operation to be associated with a retail type of business.

As illustrated in FIG. 1, the merchant device(s) 116 send application request(s) 156 to the payment service 108. In some instances, the application request(s) 156 include messages requesting one or more of the application(s) for 114 for download to the merchant device(s) 116. For instance, a merchant 102 may utilize a merchant device 116 to access an online marketplace (and/or another type of online service) for the application(s) 114. The merchant 102 can then search through the online marketplace to identify at least one application 114 for download. After identifying the application 114, the merchant device 116 can send an application request 156 to the payment service 108 requesting the identified application 114.

The payment service 108 can receive the application request(s) 156 from the merchant device(s) 116 and send application(s) 158 in response. For instance, and using the example above, the payment service 108 can receive the application request 156 from the merchant device 116. Based on receive the application request 156, the payment service 108 can cause the application 158 to be send to the merchant device 116, where the application 158 corresponds to the application 114 requested by the merchant device 116.

Although above describes integrating functionality across multiple applications 114 that are associated with types of business that includes retail, services, and restaurants, the above techniques can be used to integrate functionality across applications 114 that are associated with other types of business. For instance, the payment service 108 may provide applications 114 that are associated with various MCCs. To customize applications(s) 114, the payment service 108 may create a rule engine 154 using the code from each of the applications 114, and then generate customized applications(s) 114 using the rule engine 154. By generating customized application(s) 114 using the rule engine 154, the application(s) 114 will include functionality of two or more of the applications 114 that are associated with the various MCCs.

As discussed herein, processor(s), such as processor(s) 120, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 122, may be an example of tangible non-transitory computer storage media and may include volatile and non-volatile memory and/or removable and non-removable media implemented in any type of technology for storage of information such as computer-readable processor-executable instructions, data structures, program components or other data. The memory may include, but is not limited to, RAM, ROM, EEPROM, flash memory, solid-state storage, magnetic disk storage, optical storage, and/or other computer-readable media technology.

Further, in some cases, devices, such as merchant device(s) 116, the payment service 108, a customer device, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, components or components that may be executed by the processor(s). Further, when mentioned, non-transitory computer-readable media exclude media such as energy, carrier signals, electromagnetic waves, and signals per se.

As discussed above, the memory 122 may include functional components, such as the operating system 124, for controlling and managing various functions of the payment service 108 and for enabling basic user interactions with the payment service 108.

Figure 2:
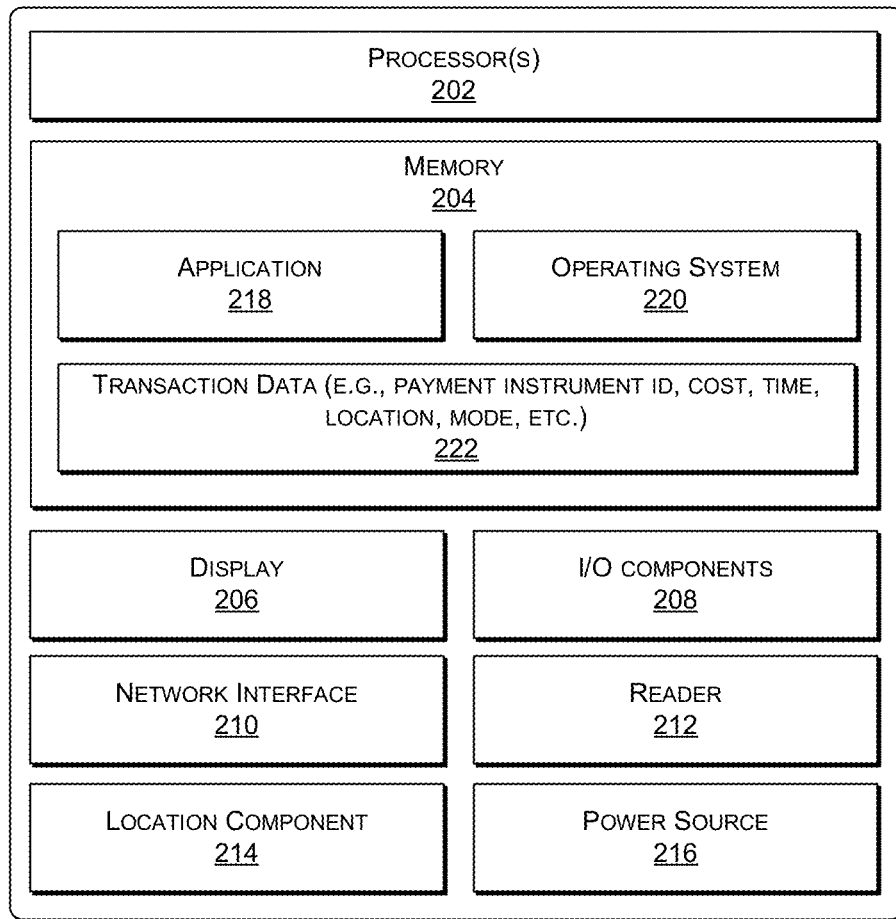
FIG. 2 illustrates components of a merchant or customer device.

FIG. 2 illustrates select example components of an example merchant device 200 according to some implementations. The merchant device 200 may include any of the merchant device(s) 116 from FIG. 1. The merchant device 200 may be any suitable type of computing device, e.g., mobile, semi-mobile, semi-stationary, or stationary. Some examples of the merchant device 200 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the merchant device 200 includes at least one processor 202, memory 204, a display 206, one or more input/output (I/O) components 208, one or more network interfaces 210, at least one card reader 212, at least one location component 214, and at least one power source 216. Each processor 202 may itself comprise one or more processors or processing cores. For example, the processor 202 can be implemented as one or more microprocessors, microcomputers, microcontrollers, digital signal processors, central processing units, state machines, logic circuitries, and/or any devices that manipulate signals based on operational instructions. In some cases, the processor 202 may be one or more hardware processors and/or logic circuits of any suitable type specifically programmed or configured to execute the algorithms and processes described herein. The processor 202 can be configured to fetch and execute computer-readable processor-executable instructions stored in the memory 204.

Depending on the configuration of the merchant device 200, the memory 204 may be an example of tangible non-transitory computer storage media and may include volatile and nonvolatile memory and/or removable and non-removable media implemented in any type of technology for storage of information such as computer-readable processor-executable instructions, data structures, program components or other data. The memory 204 may include, but is not limited to, RAM, ROM, EEPROM, flash memory, solid-state storage, magnetic disk storage, optical storage, and/or other computer-readable media technology. Further, in some cases, the merchant device 200 may access external storage, such as RAID storage systems, storage arrays, network attached storage, storage area networks, cloud storage, or any other medium that can be used to store information and that can be accessed by the processor 202 directly or through another computing device or network. Accordingly, the memory 204 may be computer storage media able to store instructions, components or components that may be executed by the processor 202. Further, when mentioned, non-transitory computer-readable media exclude media such as energy, carrier signals, electromagnetic waves, and signals per se.

The memory 204 may be used to store and maintain any number of functional components that are executable by the processor 202. In some implementations, these functional components comprise instructions or programs that are executable by the processor 202 and that, when executed, implement operational logic for performing the actions and services attributed above to the merchant device 200. Functional components of the merchant device 200 stored in the memory 204 may include an application 218, which may include one of application(s) 114 from FIG. 1.

As discussed above, the application 218 may cause the merchant device 200 to operate in various modes of operation, where each mode of operation is associated with a respective type of business. For each mode of operation, the application 218 can cause the merchant device 200 to present a user interface for inputting information describing item(s)/service(s) being acquired by customer(s) during a respective transaction. Additionally, each user interface may enable the merchant device 200 to receive payments from customers, as well as communicate with the payment service 108 for processing payments and sending transaction information. Further, in some instances, the application 218 may present a user interface to enable the merchant to manage the merchant's account, manage the merchant's catalog, manage the merchant's inventory, and the like. Finally, the application 218 may receive recommendations from the payment service 108, such as recommendations for item(s)/service(s) and/or recommendations for quantities of items.

Additional functional components may include an operating system 220 for controlling and managing various functions of the merchant device 200 and for enabling basic user interactions with the merchant device 200. The memory 204 may also store transaction data 222 that is received based on the merchant associated with the merchant device 200 engaging in various transactions with customers, such as the example customer 104 from FIGS. 1-4. Additionally, the memory 204 may store contact information for customer, such as the customer 104.

In addition, the memory 204 may also store data, data structures and the like, that are used by the functional components. For example, this data may include item information that includes information about the items offered by the merchant, which may include images of the items, descriptions of the items, prices of the items, and so forth. Depending on the type of the merchant device 200, the memory 204 may also optionally include other functional components and data, which may include programs, drivers, etc., and the data used or generated by the functional components. Further, the merchant device 200 may include many other logical, programmatic and physical components, of which those described are merely examples that are related to the discussion herein. The merchant device 200 may also include transaction data 222 (e.g., payment instrument, payment proxy, cost of items, time of the transaction, location of the transaction, mode of operation, etc.). Additionally, the transaction data may also include a database of queries or challenge query(s) 113 for the customer to authenticate a customer's payment transaction. The transaction data 222 may be in communication with the server, such as PSS 108.

Consumer authentication relates to a determination as to whether or not the person conducting the transaction is in fact the owner or authorized user of the portable consumer device. The merchants conduct conventional consumer authentication processes. For example, merchants may ask to see a credit card holder's driver's license, before conducting a business transaction with the credit card holder. Other ways to authenticate the consumer would be desirable, since consumer authentication at the merchant does not occur in every instance. Specific examples of possible ways to improve the consumer authentication process include at least the following: knowledge-based challenge responses, hardware tokens, timed certificates, PINs, signatures, one-time passwords, etc.

The network interface(s) 210 may include one or more interfaces and hardware components for enabling communication with various other devices over the network or directly. For example, network interface(s) 210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 2 further illustrates that the merchant device 200 may include the display 206 mentioned above. Depending on the type of computing device used as the merchant device 200, the display 206 may employ any suitable display technology. For example, the display 206 may be a liquid crystal display, a plasma display, a light emitting diode display, an OLED (organic light-emitting diode) display, an electronic paper display, or any other suitable type of display able to present digital content thereon. In some examples, the display 206 may have a touch sensor associated with the display 206 to provide a touchscreen display configured to receive touch inputs for enabling interaction with a graphic interface presented on the display 206. Accordingly, implementations herein are not limited to any particular display technology. Alternatively, in some examples, the merchant device 200 may not include the display 206, and information may be present by other means, such as aurally.

The I/O components 208, meanwhile, may include speakers, a microphone, a camera, and various user controls (e.g., buttons, a joystick, a keyboard, a keypad, etc.), a haptic output device, and so forth. For instance, I/O components 208 can include a printing device for printing physical receipts for customers. In some examples, the POS device uses the printing device to print the physical receipts after receiving data representing the receipts from a payment service.

It should be noted that, in some examples, the I/O components 208 may be separate from the merchant device 200. For instance, the printing device may be separate from the merchant device 200. In some examples, the merchant device 200 sends data representing the receipts to the printing device in order to cause the printing device to print physical receipts.

In addition, the merchant device 200 may include or may be connectable to a payment instrument reader 212. In some examples, the reader 212 may plug in to a port in the merchant device 200, such as a microphone/headphone port, a data port, or other suitable port. In other instances, the reader 212 is integral with the entire merchant device 200. The reader 212 may include a read head for reading a magnetic strip of a payment card, and further may include encryption technology for encrypting the information read from the magnetic strip. Alternatively, numerous other types of card readers may be employed with the merchant device 200 herein, depending on the type and configuration of a particular merchant device 200.

The location component 214 may include a GPS device able to indicate location information, or the location component 214 may comprise another other location-based sensor. The merchant device 200 may also include one or more additional sensors (not shown), such as an accelerometer, gyroscope, compass, proximity sensor, and the like. Additionally, the merchant device 200 may include various other components that are not shown, examples of which include removable storage, a power control unit, and so forth.

Figure 3:
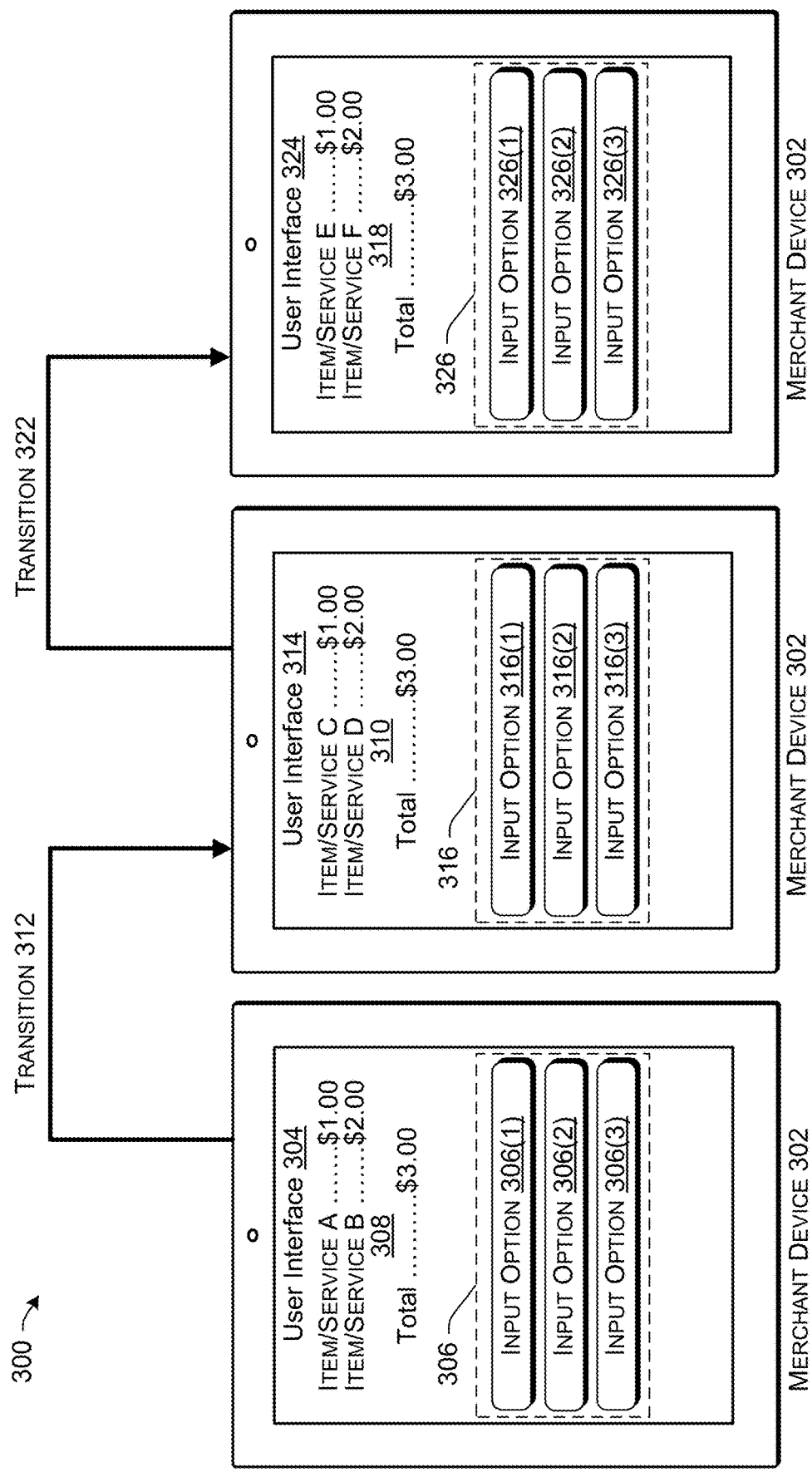
FIG. 3 illustrates an example of switching between different modes of operation during respective transactions and generation of different set of query(s) as the mode changes.

FIG. 3 illustrates an example of switching between different modes of operation during the same or different transactions, where each mode corresponds to a unique set of challenge query(s), such as query(s) 113, changing, for example based on item selection or customer input. For example, the transaction may differ from another based on a nature of items and/or the payment instrument or payment device associated with the customer, accordingly the challenge query(s) 113 and the proposed answers may also dynamically vary. The merchant device 302, which may include one of the merchant device(s) 116 from FIG. 1, may execute an application that causes the merchant device 302 to operate in a first mode of operation. While operating in the first mode of operation, the merchant device 302 provides a first user interface 304 based on a relationship between a first type of business or item being purchased and a customer (including the customer's payment instrument or payment device). As shown, the first user interface 304 includes input options 306 for inputting information describing distinct queries or answers to queries based on items/services being acquired by a first customer during a first transaction. The queries, in one implementation, are query(s) 113 posed as challenges to determine whether or not the transaction is risky or fraudulent, and if so, the level of risk associated with such a transaction. Based on the response provided by the customer, the payment service can perform various follow-up actions. For example, if the customer answers correctly, the payment service can process the transaction despite initial high-risk assessment. In another example, the payment service can reduce the risk but still not process the transaction and ask the customer to provide a secondary authentication, such as a PIN or password and the like.

As shown in the example, in one implementation, the customer is interacting with first type of business to purchase items A and B and the first type of business is associated with retail merchants, and the first user interface 304 is a retail user interface. The customer at this point may or may not have provided the payment instrument to purchase said items. However, the customer may have provided some form of identification, for example, either through a PII or indirectly through a registered device or web application executing on the registered device, where the device or application may be detected by the POS terminal after explicit approval from the customer to do so. The payment service then takes the customer data, including the payment instrument data in case such information is available, and determines if the customer has previously interacted with the payment service.

If the customer has not previously interacted with the payment service, the payment service may phrase challenge query(s) 113 based on the payment instrument data or other customer data available. Alternatively, the payment service may generate the query(s) 113 based on behavior of customers similar to this particular customer, or the customer may be asked to provide secondary authentication, like a PIN or password associated with the payment instrument or a payment application executing on their device.

If the customer has interacted with the payment service at a prior time (for example, by initiating payment transactions at any of the merchant locations—web or brick or mortar), the payment service further determines if the customer has interacted with the merchant and/or a similar type of merchant or business. Further, the payment service may also analyze the nature of items bought by customer in the past. The payment service may compute a level of risk associated with the transaction, for example, based on whether or not the customer has previously bought the item or visited that merchant/type of business before, the time of transaction, or the size of the ticket. If the risk is higher than a threshold level (for example, a dynamic or customized value set up for the merchant or customer, or a static value set for all merchants or customers), the payment service may present a challenge question to the customer in addition to or in place of a traditional method of authentication, such as a PIN or password. Similarly, the customer may also be presented with a question depending on the nature of the first type of business and the customer's interaction with comparable businesses, for example, if the customer has not interacted with that specific business or merchant but interacted with other businesses. In some implementations, the payment service may present the challenge question in response to an action from the customer not corroborating with the customer's usual transaction behavior.

Going back to the figure, the input options 306-1, 306-2, and 306-3 may include single or multiple challenge queries or query(s) 113 designed based on whether or not the customer has interacted with the payment service before. Once the user or merchant selects question for the user, the input options 306 may provide answers in multiple choice or single choice for the user to confirm. Such answers may be presented on the same interface or a subsequent user-interface or screen. The queries may change based on the item selection, as shown in transition 312 and 322.

In one implementation, the merchant device 302 may receive input from the merchant, for example selection of items requested by the customer, and then update the first user interface 304 based on the input. For instance, as shown in FIG. 3, the first user interface 304 indicates that the first customer is acquiring item/service A and item/service B from the merchant during the first transaction.

After inputting each of the items/services for the first transaction, the merchant can use the merchant device 302 to authorize payment for the first transaction. For instance, the merchant can cause the merchant device 302 to send transaction information associated with the first transaction, along with payment information associated with a payment instrument of the first customer and/or a CVM (such as a signature or PIN entered by the customer) to a payment service for authorization. In response, the merchant device 302 can receive a message indicating whether the payment instrument was authorized for a cost of the first transaction. In some implementations and as disclosed herein, before the authorization or contemporaneous to the authorization, the customer may be asked to provide additional level of authentication besides CVM. The additional level of authentication can be in the form of a challenge question, where the challenge question The first interface 304 further includes two input options for transitioning the merchant device 302 to different modes of operation. For instance, a selection of items 308 may cause the merchant device 302 to transition to operating in a second mode of operation, which may be associated with a second set of challenge query(s) 113. Additionally, a second input option 310 may cause the merchant device 302 to transition to operating in a third mode of operation, which may be associated with a third set of challenge query(s) 113.

For instance, the merchant device 302 may select items 308. Based on receiving the input, the merchant device 302 may transition 312 to the second mode of operation. While operating in the second mode of operation, the merchant device 302 provides a second user interface 314 associated with the second set of challenge query(s) 113. As shown, the second user interface 314 includes input options 316 for inputting information describing items/services being acquired by the customer during the transaction. In some instances, one or more of the input options 316 differ from the input options 306.

Similarly, the merchant device 302 may receive selection of items 310. Based on receiving the input, the merchant device 302 may transition 322 to the third mode of operation. While operating in the third mode of operation, the merchant device 302 provides a third user interface 324 associated with the third set of challenge query(s) 113. As shown, the third user interface 324 includes input options 326 for inputting information describing items/services being acquired by a third customer during the transaction. In some instances, one or more of the input options 326 differ from one or more of the input options 306 and/or one or more of the input options 316.

In another implementation, the input options 306 may also be multiple-choice answers to a query, labeled query A, based on an item or items being purchased by the customer. For example, the query may be "When was the last time you bought the item (e.g., drip coffee)?" or "How often do you order the item (e.g., drip coffee)?". The customer answers to query A are a first input option 306(1), a second input option 306(2), and a third input option 306(3). In one implementation, the answers may be in the request a user input in a text field inputting information describing an item (e.g., a barcode, SKU number, an identity of the item, etc.), for inputting information describing a quantity of the item being acquired by the first customer, for inputting information describing attributes associated with the item (e.g., size, color, style, etc.).

Figure 4:
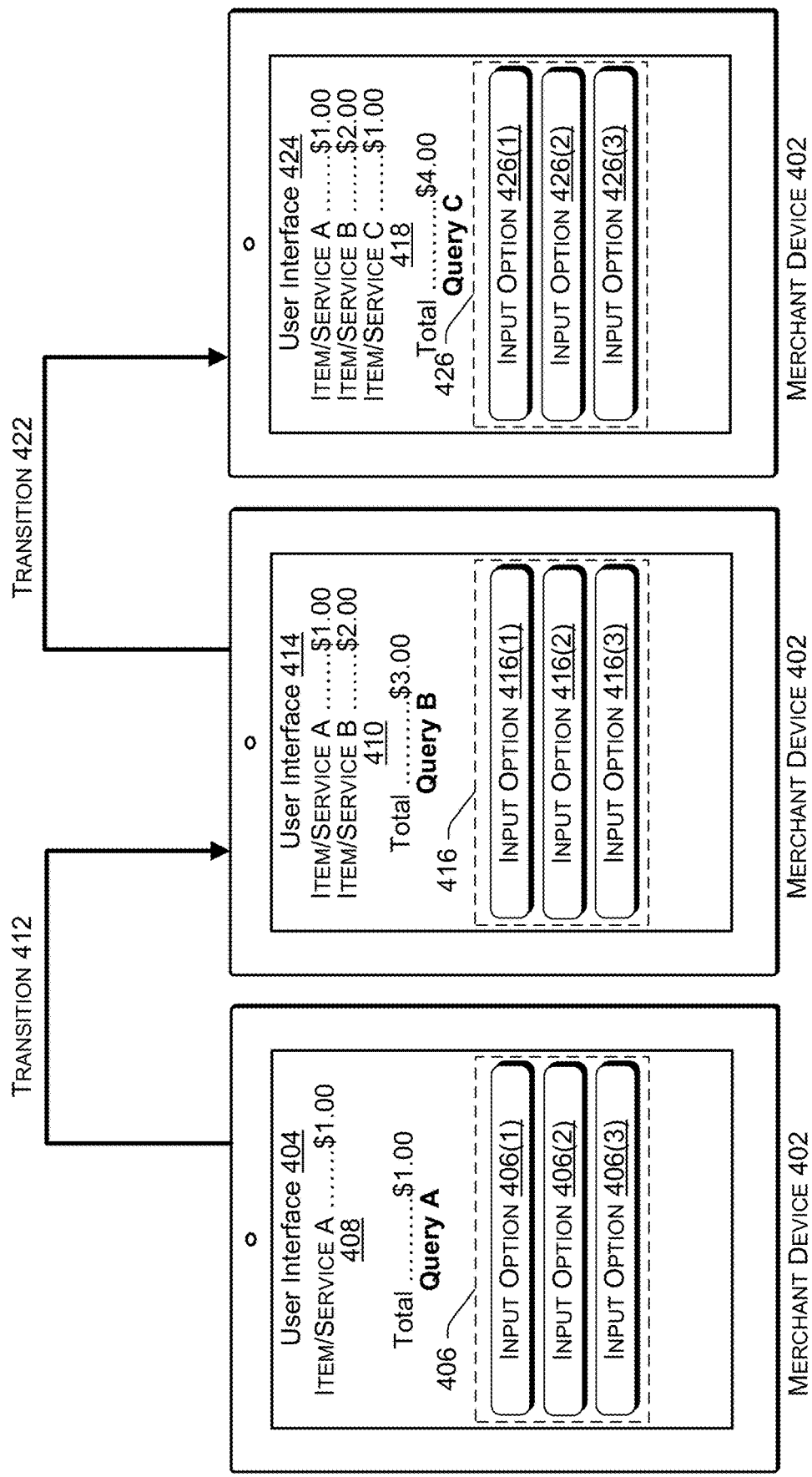
FIG. 4 illustrates an example of switching between different modes of operation during a single transaction and generation of different set of answers as the mode changes.

FIG. 4 illustrates switching between different modes of operation during a single transaction and where answers are provided in a multiple-choice format or as text-fields for user to input, in an exemplary embodiment. For instance, the merchant device 402, which may include one of the merchant device(s) 116 from FIG. 1, may execute an application that causes the merchant device 402 (or customer device) to operate in a first mode of operation. While operating in the first mode of operation, the merchant device 402 provides a first user interface 404 associated with a first set of items. As shown, the first user interface 404 includes input options 406 for responding to query A, based on an item or items being purchased by the customer. For example, the query may be "When was the last time you bought the item (e.g., drip coffee)?" or "How often do you order the item (e.g., drip coffee)?". The customer answers to query A are a first input option 406(1), a second input option 406(2), and a third input option 406(3), all are selectable and out of which one is correct. In one implementation, the answers may be in the request a user input in a text field inputting information describing an item (e.g., a barcode, SKU number, an identity of the item, etc.), for inputting information describing a quantity of the item being acquired by the first customer, for inputting information describing attributes associated with the item (e.g., size, color, style, etc.).

The first user interface 404 further includes two input options for transitioning the merchant device 402 to different modes of operation. For instance, a first input option 408 may cause the merchant device 402 to transition to operating a second mode of operation, which may be associated with a second set of question and answers. Additionally, a second input option 410 may cause the merchant device 402 to transition to operating in a third mode of operation, which may be associated with a third set of question and answers.

For instance, the merchant device 402 may receive input selecting the second input option 408. Based on receiving the input, the merchant device 402 may transition 412 to the second mode of operation. While operating in the second mode of operation, the merchant device 402 provides a second user interface 414 associated with the second set of question and answers. As shown, the second user interface 414 includes input options 416 for inputting information describing items/services being acquired by the customer during the transaction. In some instances, one or more of the input options 416 differ from the input options 406.

For example, if the items A and B are being purchased by the customer, the second user interface 414 is a services user interface, the input options 416 may include a first input option 416(1) for inputting information describing a service (e.g., description of the service, type of service being acquired, etc.), a second input option 416(2) for inputting information describing a scheduled time for the service (e.g., at 10:00, between 10:00 and 11:00, etc.), and a third input option 416(3) for inputting information describing how the service is to be performed. The merchant device 402 may receive input from the merchant via the input options 416, and then update the second user interface 414 based on the input. For instance, as shown in FIG. 4, the second user interface 414 indicates that the customer is now acquiring item/service A and item/service B from the merchant during the transaction.

The second user interface 414 further includes two input options for transitioning the merchant device 402 to different modes of operation. For instance, a first input option 418 may cause the merchant device 402 to transition to operating in the first mode of operation, which may be associated with the first type of business. Additionally, a second input option 420 may cause the merchant device 402 to transition to operating in the third mode of operation, which may be associated with the third set of query(s) 113 or cancel the mode of operation and resort to conventional method of authentication or even terminate the transaction.

For instance, the merchant device 402 may receive input selecting the second input option 418. Based on receiving the input, the merchant device 402 may transition 422 to the third mode of operation. While operating in the third mode of operation, the merchant device 402 provides a third user interface 424 associated with the third type of transaction. As shown, the third user interface 424 includes input options 426 for inputting information describing items/services being acquired by the customer during the transaction. In some instances, one or more of the input options 426 differ from one or more of the input options 406 and/or one or more of the input options 416.

For example, if the third type of business is associated with restaurants, and the third user interface 424 is a restaurant user interface, the input options 426 may include a first input option 426(1) for inputting information describing a menu item (e.g., an identity of the menu item, a code/number associated with the menu item, etc.), a second input option 426(2) for inputting any sides to include with the menu item (e.g., side of fries, a salad, etc.), and a third input option 426(3) for inputting information describing how the menu item is to be prepared (e.g., medium, extra ketchup, etc.). The merchant device 402 may receive input from the merchant via the input options 426, and then update the third user interface 424 based on the input. For instance, as shown in FIG. 4, the third user interface 424 indicates that the customer is now acquiring item/service A, item/service B, and item/service C from the merchant during the transaction.

After inputting each of the items/services for the transaction, the merchant can use the merchant device 402 to authorize payment for the third transaction. For instance, the merchant can cause the merchant device 402 to send transaction information associated with the transaction, along with payment information associated with a payment instrument of the customer, to a payment service for authorization. In response, the merchant device 402 can receive a message indicating whether the payment instrument was authorized for a cost of the transaction.

The third user interface 424 further includes two input options for transitioning the merchant device 402 to different modes of operation. For instance, a first input option 428 may cause the merchant device 302 to transition to operating in the first mode of operation, which may be associated with the first type of business. Additionally, a second input option 430 may cause the merchant device 402 to transition to operating in the second mode of operation, which may be associated with the second type of business.

Figure 5:
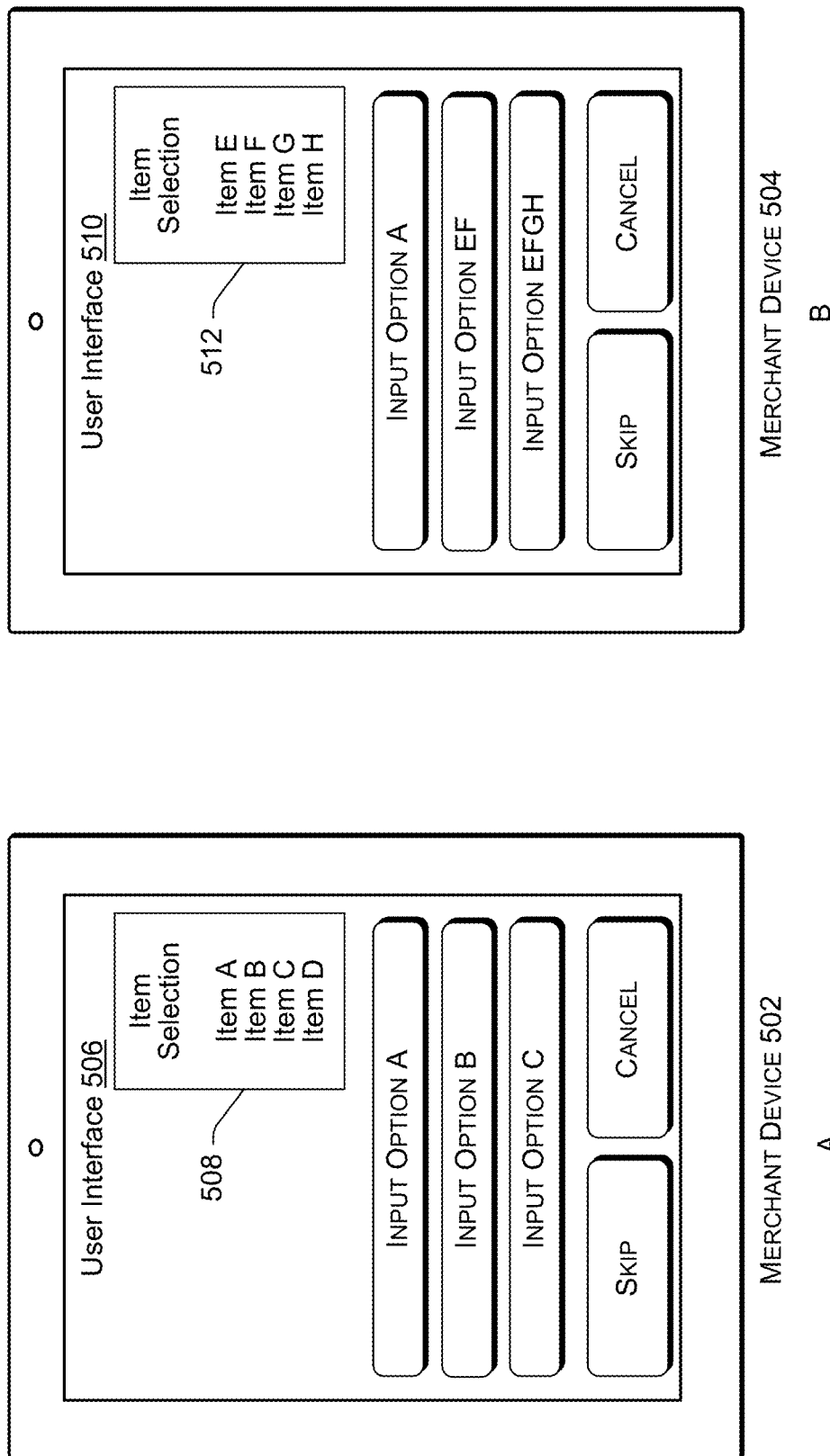
FIG. 5 illustrates an example of customizing user interfaces for respective merchants or customers.

FIG. 5 illustrates an example of customizing user interfaces for respective merchants. For instance, the payment service may generate customized applications for merchants based on transaction information associated with the respective merchants. In some instances, customizing an application may include causing the one or more user interfaces associated with the application to provide content based on the transaction information. For instance, as illustrated in FIG. 5, each of the merchant device 502 and the merchant device 504 (which may each represent one of merchant device(s) 116) are displaying content that is customized for a respective merchant.

For instance, merchant device 502 may be executing an application that causes the merchant device 502 to provide a user interface 506. In some instances, the user interface 506 may be similar to one or more of the user interfaces 304, 314, 324 of FIG. 3, and/or one or more of the user interfaces 404, 414, 424 of FIG. 4. However, the user interface 506 may include an item selection element 508 that allows a first merchant to quickly select items A-D as per customer order. For instance, each of "Item A", "Item B", "Item C", and "Item D" or the combination thereof may then generate an input option that, when selected by the first merchant, presents the challenge question to the customer to authenticate a current transaction between the first merchant and a customer. In this case, the merchant may access a portion of the database stored in the payment service instead of the entire database. This, in turn, helps in reducing the access time and generating relevant challenge query(s), such as challenge query(s) 113 quickly.

Additionally, merchant device 504 may be executing an application that causes the merchant device 504 to provide a user interface 510. In some instances, the user interface 510 may be similar to the user interface 506, and also include an item selection element 512. However, the item selection element 512 of user interface 510 allows a second merchant to select Items E-H and then generate challenge query(s) 113 specific to the second merchant. For instance, each of "Item E", "Item F", "Item G", and "Item H" or their combination may include one or more input options that, when selected by the second merchant, presents the challenge question to the customer to authenticate a current transaction between the first merchant and a customer. In this case, the merchant may access a portion of the database stored in the payment service instead of the entire database. This, in turn, helps in reducing the access time and generating relevant challenge query(s) 113 quickly.

In some instances, the payment service generates the applications and/or updates the applications based on transaction information associated with the first merchant and the second merchant, respectively. For instance, the payment service may determine that, based on the transaction information for the first merchant, customers acquire a greater number of Items A-D from the first merchant than any other item. As such, the payment service may generate the application for the first merchant, and/or update the application for the first merchant after the merchant device 502 downloads the application, such that user interface 506 includes the item selection element 508 that allows a first merchant to quickly generate query(s) 113 according to items A-D during a transaction.

Additionally, the payment service may determine that, based on the transaction information for the second merchant, customers acquire a greater number of Items E-H from the second merchant than any other item. As such, the payment service may generate the application for the second merchant, and/or update the application for the second merchant after the merchant device 504 downloads the application, such that user interface 510 includes the item selection element 512 that allows a second merchant to quickly generate query(s) 113 corresponding to items E-H during and before a transaction.

Further, as shown in A, in one implementation, the input options are challenge query(s) 113 with multiple choice answers shown in a subsequent interface after the customer has made a selection of the input option, and the challenge query(s) 113 may include static query(s) 113, selected from a database of query(s) 113 at the server, and/or based on items offered at the merchant location. The challenge query(s) 113 may also be dynamically generated as shown in B where the query(s) 113 are based on the selection if items and the current or past transaction behavior or trends.

Figure 6:
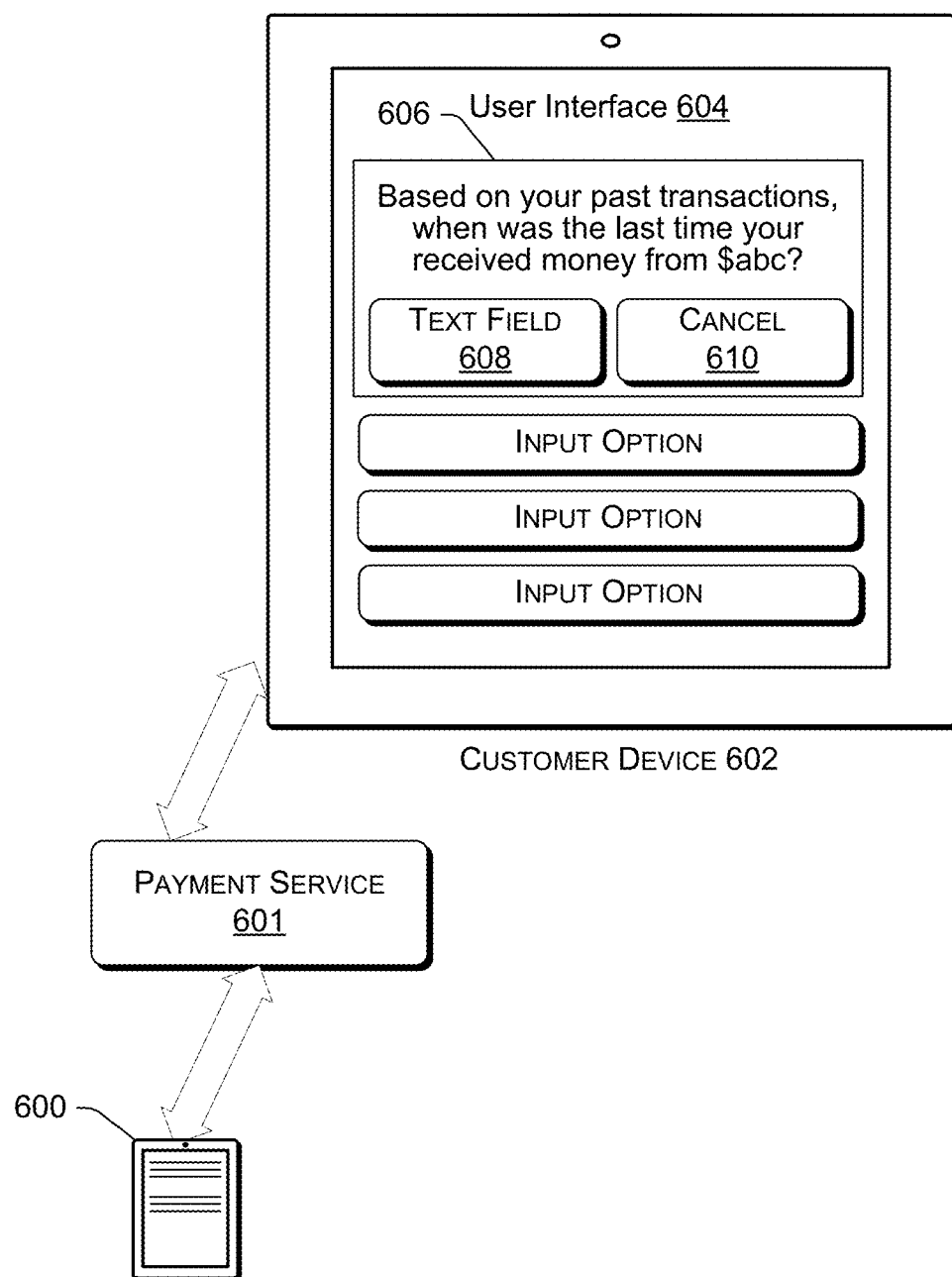
FIG. 6 illustrates an example of requesting response to a challenge question from a recipient user receiving electronic cash from a sender user.

FIG. 6 illustrates an example of generating a user interface, for example as a push notification, on a recipient's user device when electronic cash is transferred between a sender and a recipient through a payment service, according to an embodiment of the present subject matter.

For instance, as illustrated in FIG. 6, a sender device 600 sends electronic cash to a recipient device 602 through a payment service system 601. In some embodiments, the payment service 601 includes an application server (e.g., a server of the servers) that supports an application (hereinafter, "payment service application"). The payment service application includes one or more graphical user interfaces for presenting content and processing user requests. The payment service application can be a mobile application (i.e., "mobile payment application") installed on a mobile device or a conventional software application installed on a conventional personal computer. Users can utilize the system application to interact with other users. The system application can be a messaging application. For example, through the system application, users create account logins to connect to their social identities (e.g., social profiles or social accounts) to communicate with other social identities, read messages, create or post messages, communicate in real-time with other users (e.g., chat), and/or otherwise engage or interact with other users of the system application (e.g., "friends," "social contacts," or other types of social network connections). In some embodiments, the user interactions on the system website lead to internal API communication, which involves the application server monitoring the messages for an indication of an intent to transfer money, sending, in response to such indication, requests (e.g., POST or GET requests) to the API of the server(s) to query the database(s), and displaying the data returned by the APIof the server(s) as appropriate. The users can also be contacts on their mobile phone or other portals.

For example, through the payment service application, users create account logins to utilize financial services offered by the payment service 601, to link their financial accounts with the payment service 601 (e.g., registration with the payment service 601), to transfer money using their user accounts and/or financial accounts, and/or otherwise engage with the services offered by the payment service 601 via the payment service application.

In accordance with various embodiments, a payment transaction (e.g., a transferring of money) can originate at a sender device, such as the desktop 102A. For example, a user can initiate a payment transaction by using a sender device to access and/or interact on a forum, such as a social networking website hosted by the Web server (not shown). In another example, a user can initiate a payment transaction by using a sender device to access an application such as a messaging application supported by the application server (not shown). In yet another example, a user can initiate a payment transaction by using a sender device to access an application such as the payment service application supported by the payment service 601.

The payment service 601 can process the payment transaction on behalf of the user. Processing the payment transaction involves identifying a financial account of a sender user and a financial account of a recipient user (e.g., by accessing the database of the payment service 601).

In accordance with various embodiments of the disclosed technology, the financial account of the recipient user can be identified based on a universal address associated with the recipient user. For example, the recipient user may have previously created a universal address (e.g., $redcross or any other user input having the syntax of the monetary indicator preceding the alphanumeric characters) to be used with a service provided by the payment service 601 (e.g., a money transfer service), and entered financial account information through a GUI (e.g., an interactive payment receiving interface) of the payment service application of the payment service 601. In this example, the payment service 601, in turn, associates the financial account information with the recipient users newly created universal address in this registration process. In other words, upon submission of information by the recipient user, the payment service 601 automatically registers the financial account and the universal address with the payment service 601 on behalf of the recipient user. The recipient user can submit financial account information for one or more financial accounts. Associations of the one or more financial accounts with the recipient user's universal address can be stored on the payment service 601 (e.g., DB). Information of the financial accounts can be used for future payment transactions (e.g., money transfers).

In accordance with various embodiments of the disclosed technology, the financial account of the sender user can be identified based on identifier associated with the sender user ("sender identifier"). In some embodiments, the payment service 601 can receive the sender identifier from the Web server or the application server. In some embodiments, the payment service 601 receives the sender identifier from the payment service application supported by the payment service 601.

The payment service 601 can identify a financial account of the sender user based on an association between that financial account and the sender identifier. For example, the sender user may have previously received payment (e.g., from another sender user) and entered financial account information through a GUI of the payment service application of the payment service 601 (e.g., an interactive payment receiving interface). In such an example, the payment service 601 may have identified the sender identifier of the sender user (e.g., via email sent to the sender user or text message). In turn, the payment service 601 stores the financial account information in association with the sender identifier newly created by virtue of accepting the payment from the other sender user (using the service provided by the payment service 601). The sender user can submit financial account information for one or more financial accounts. Associations of the one or more financial accounts with the sender identifier can be stored on the payment service 601 (e.g., DB 605). Information of these financial accounts can be used for future payment transactions (e.g., money transfers).

If no financial account information is identified for either the sender user or the recipient user, the payment service 601 can send a message (e.g., a financial account request message) to the respective user requesting that financial account information to be submitted. The message can be a confirmation message that includes a secure link to enter the financial account information, such as a debit card number or a credit card number and associated authentication information (e.g., expire date, ZIP Code, PIN number, or security code). For example, the respective user can simply input financial account information, such as a debit card number or a credit card number.

When the financial account information is identified for both the sender user and the recipient user (either initially or later submitted through the confirmation message), the payment service 601 sends a request to transfer money, e.g. via the card payment network or the ACH network. In particular, to transfer money between the sender user and the recipient user (identified based on the universal address), the payment service 601 can operate as a gateway or a middleman.

To operate as a gateway, the payment service 601 can identified debit card accounts, e.g. stored at the servers, for both the sender user and the recipient user. The payment service 601 can submit a request to an appropriate card issuer e.g., to the sender user's card issuer or to the receiving user's card issuer, to transfer money. For example, the request can be sent over debit rails. That is, a debit card network can receive the request and can carry out the request to transfer money. The appropriate card issuer can receive and process the request by transferring money to the appropriate card account.

To operate as a middleman, the payment service 601 can receive a payment amount by processing a card, e.g., a credit card or a debit card, of the user sender and hold the payment amount. The payment service 601 can push the payment amount, e.g., over debit rails, to a debit account of the recipient user. Instead of holding the payment amount, the payment service 601 can also forward the payment once the recipient user links the account with the payment service 601. Alternatively, the payment service 601 can generate a transaction ACH that debits an amount from the sender bank account and can credit the amount into a recipient bank account, e.g., using ACH, or onto a debit account, e.g., over debit rails, of the recipient user.

In one implementation, the sender user can send money to the recipient user but expect a confirmation that the money is being sent to the right recipient user before the fund transfer is made. Conventionally, the sender user enters the details of the account number which is unique and if incorrect is promptly rejected by the financial institutions. However, with a mechanism like the one disclosed here, the sender user may incorrectly enter an incorrect payment proxy, phone number or email address causing the money to be transferred to the wrong recipient. The sender user may not find out about the incorrect transaction until it is too late to recover money and send it to the right recipient.

To this end, in one implementation, the sender user may first request the recipient user to answer a challenge question, such as shown in user interface 606. The recipient may choose from a variety of options, labeled input options, or enter their own response in the text field 608. The payment service or the POS terminal can validate the response. If the recipient user answers the question correctly, the payment service may initiate the fund transfer as per protocol. However, of the recipient user does not answer the question directly, the payment service may either ask another question (or a fixed number of query(s)) for the recipient user to answer. The payment service may then, after a string of incorrect answers, stop the fund transfer and indicate as such to the sender user. The sender user may then revise the money transfer request accordingly, for example by correcting the details of the recipient user.

In one implementation, the payment service may generate challenge query(s), such as challenge query(s) 113 for authentication in specific cases, and transfer the money without authentication by challenge query(s) 113 in others. For example, the payment service may generate the challenge query(s) 113 when the transaction amount exceeds a certain amount, name of the recipient user is used for the first time by the sender user, or if the recipient user is new to the payment service, and so on. In some implementations, the payment service may apply behavior and trend analysis through algorithms to analyze the transaction history of the sender user, the transaction history of the recipient user, the interaction and transaction history between the sender user and the recipient user, including various trends such as time, place and amount associated with such transactions. The payment service may compare the details of the current money request to the stored transaction history and execute the behavior and trend analysis to determine whether the current money request flags an anomaly in behavior of sender user or recipient user or both. For example, if the sender user or recipient user have never interacted, never transacted more than or less than a certain amount, transacted more than a frequency of times in a month, year or day, the details between the recipient user differ slightly to a contact of the sender user, and so on, the payment service flags it as an anomaly.

Accordingly, the payment service can generate query(s) 113, answers to which the recipient user, would know since the sender user and recipient user have interacted before. The recipient user may also access their transaction history to select an appropriate answer. In some implementations, the payment service may recommend an answer to the recipient if the sender user and the recipient have interacted before or over a certain number of times.

As mentioned before, the challenge query(s) 113 may be based on the transaction history and can be drafted based on the context of the interaction between the users or the recipient user alone. For example, if the transaction is happening at a certain time, the payment service may generate the question mapping interactions between the users at the time on a previous occasion. Examples of query(s) 113 may be "when was the last time you sent $10 to $redcross?," "how much did you pay for 'drink with friends'?"

As shown, the device 602 associated with the customer may be providing a user interface 604 that the merchant utilizes to send and receive electronic cash transactions. In some instances, the user interface 604 may be similar to one or more of the user interfaces 304, 314, 324 of FIG. 3, and/or be similar to one or more of the user interfaces 404, 414, 424 of FIG. 4. While providing the user interface 604, the customer device 602 may receive, from the payment service, a message that indicates the challenge question for the customer to answer. In response, the customer via the customer device 602 can provide the answer via the user interface 604, for example by selecting one of the input options.

Figure 7:
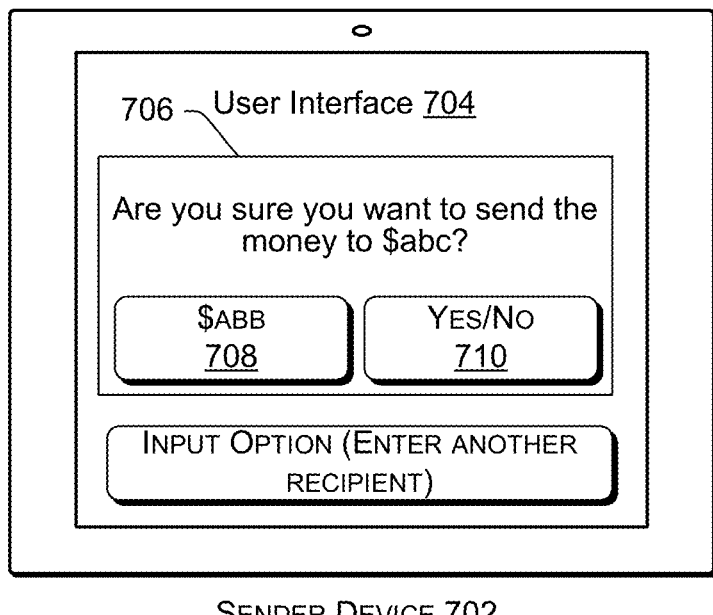
FIG. 7 illustrates an example of requesting response to the challenge question from a recipient user receiving electronic cash from the sender user.

FIG. 7 illustrates another example of challenge question presented to the sender device. For instance, as discussed above, a payment service may analyze transaction history and request the sender to confirm, from amongst the list of recipient users, which one the sender meant to send the electronic cash.

For instance, as illustrated in FIG. 7, a sender device 702 associated with a sender may be providing a user interface 704 that the sender utilizes to conduct transactions with other recipients or senders. In some instances, the user interface 704 may be similar to one or more of the user interfaces 304, 314, 324 of FIG. 3, and/or be similar to one or more of the user interfaces 404, 414, 424 of FIG. 4. While providing the user interface 704, the sender device 702 may receive, from the payment service, a message that recommends another recipient name 708 that the sender may have wanted to send the request to. The sender can make the selection via selection input 710. As shown, the message 706 may also indicate that, based on past the sender may have wanted to send the money transfer request to someone else.

Figure 8A:
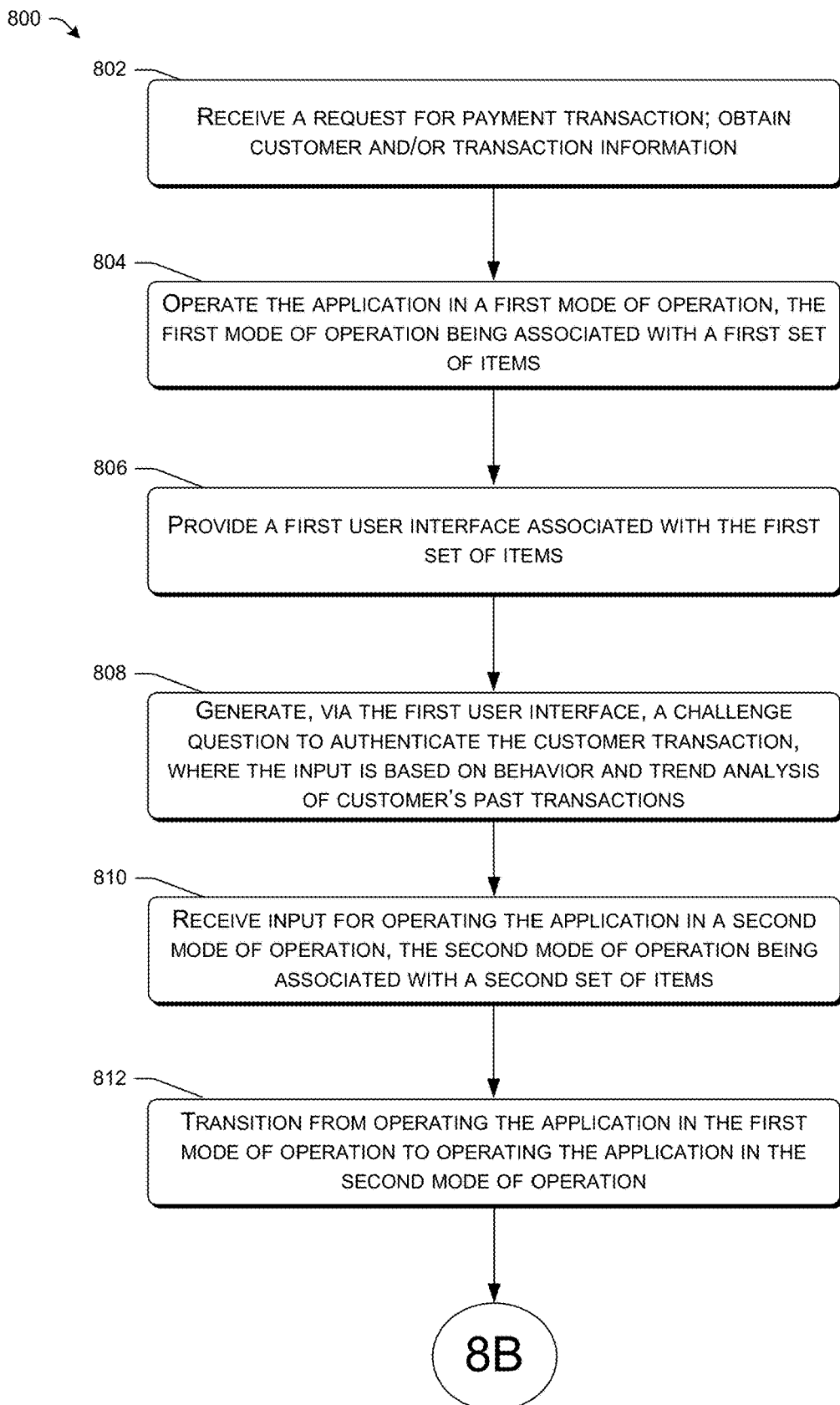
FIGS. 8A-8B illustrate a flow diagram of an example process for generating challenge query(s) for a customer to answer as a method of authentication in the context of a payment transaction.
Figure 8B:
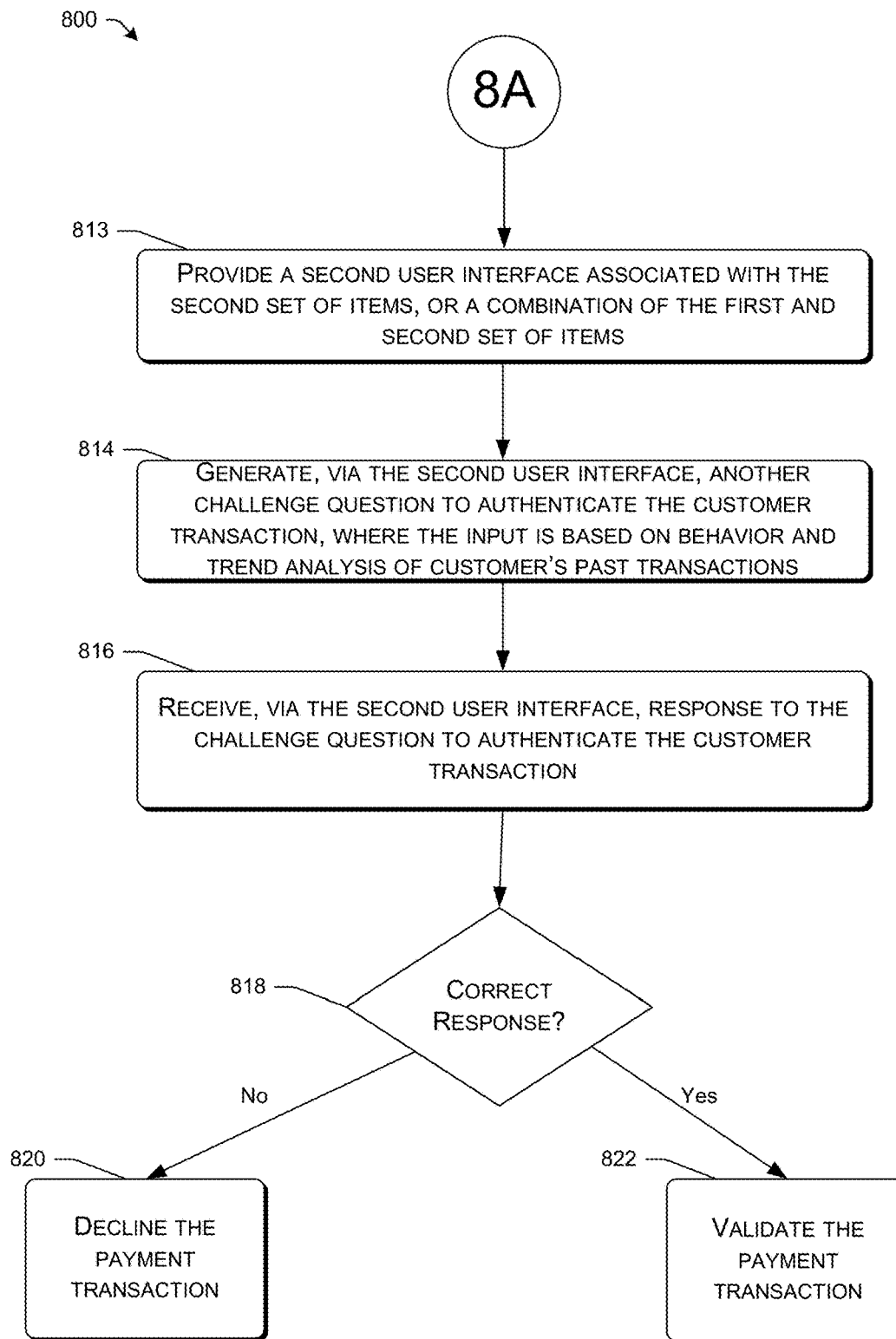

FIGS. 8A-8B illustrates a flow diagram of an example process 800 for integrating functionality across multiple applications. The process 800, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 800, and other processes described herein, may be performed by a payment service, a merchant device, a customer device, an additional electronic device, or by a combination thereof.

At 802, a merchant device, such as merchant device 116 receives a request for payment transaction. For instance, the merchant device 116 may interact with a customer through a POS terminal or reader or both, or through a customer device to receive a request for payment transaction. The request for payment transaction includes a customer swiping a payment instrument at the POS terminal. The POS terminal collects the information of the payment instrument and/or any devices associated with the customer, after customer provides explicit authorization.

The merchant device 116 can receive input selecting an application from the multiple applications. For instance, the merchant can use the merchant device 116 to select the application that is associated with a primary business purpose of the merchant (e.g., retail, services, restaurant, etc.). Based on the input, the merchant device 116 can send the third-party service a request for the application. In response, the third-party service may send the application to the merchant device 116.

At 804, the merchant device 116 operates the application in a first mode of operation, the first mode of operation being associated with a first set of items. For instance, the merchant device 116 can trigger the first mode when the merchant has selected a first set of items requested by the customer. When the merchant device 116 first executes the application, the application operates in a first mode of operation (e.g., primary mode of operation) that is associated with the type of items or other transactional details that is specific to the items. For example, if the merchant is a retail application, the query(s), such as challenge query(s) 113 may be associated with retail industry and may be saved in a query database. For a second example, if the application is a services application, the first mode of operation may be associated with query(s) 113 that relate to merchants that provide services. For a third example, if the application is a restaurant application, the first mode of operation may be associated with query(s) 113 related to restaurant merchants.

At 806, the merchant device 116 provides a first user interface associated with the first set of items. For instance, based on operating in the first mode of operation, the merchant device 116 may display a user interface that is associated with the merchant business. For instance, the user interface may include one or more input options that are associated with items and/or services provided by the merchant, which are associated with the merchant business. In one implementation, the process transitions to the next step only after a certain risk level is detected by the payment service. In another case, the process moves to step 808 irrespective of the risk level.

At step 808, the payment service generates input options such as challenge query(s) 113, where the challenge query(s) 113 are based on behavior and trend analysis of customer's past transactions and/or interactions with the merchant or similar merchants. For example, the one or more input options may be associated with retail items, services, or restaurant items are based on the merchant business. The input may be query(s) 113 presented to the customer for authenticating a transaction. The query(s) 113 may relate to location (e.g., the customer's current home, the city that the consumer recently visited) or current location (e.g., the current location of the store that the consumer is currently at), the type or name of the merchant that the consumer is presently visiting or has visited in the past, the customer's family or personal data (e.g., name, phone number, social security number, etc.), etc. The query(s) 113 in the challenge question database may be generated by a rule base and subsequently stored in the challenge question database.

Alternatively, or additionally, the challenge query(s) 113 may be generated from an external source and then subsequently stored in the challenge question database. For example, the customer may use a browser on a personal computer or the like to supply specific challenge query(s) 113 to the server via a communication medium (not shown) such as the Internet. In some embodiments, a customer may determine the kinds and/or quantity of challenge query(s) 113 to ask himself or herself. For example, the consumer may specify that the consumer wants to be asked three challenge query(s) 113 if the consumer visits a jewelry store, but only one question if the consumer visits a fast food restaurant. The types of query(s) 113 posed by the consumer may be based on the merchant type, frequency of purchasing, etc.

In preferred embodiments, the challenge query(s) 113 are derived from past transaction data in the transaction history database. The customer may conduct many, many transactions with the PSS 108 over time. This transaction information may be stored in the transaction history database over time, and challenge query(s) 113 may be generated using the transaction information. The past transaction information provides a good basis for authenticating the customer since the customer will know about what transactions that the customer has conducted in the past. For example, the consumer may have used his credit card to pay for a burger New York the previous day, and on the next day may be asked a question such as "Did you stay have a burger at Shake Shack yesterday?" In another example, the customer may have purchased an item that is more than $2000 the day before, and on the next day may be asked "Did you make a purchase for more than $2000 yesterday?" The query(s) 113/answers that are presented to the customer may be free form in nature and/or may include pre-formatted answers such as multiple choice or true-false answers from which the user may select.

The merchant device 116 receives, via the first user interface, input describing one or more first items or services. For instance, the merchant may utilize the one or more input options to input information describing one or more first items or services being acquired by a customer during a transaction. The one or more first items or services may be associated with the first type of business. For instance, the one or more first items or services may be associated with a primary business purpose of the merchant. For example, if the merchant is primarily a retail merchant, the one or more first items or services can include retail items. For a second example, if the merchant primarily provides services to customers, the one or more first items or services can include services. For a third example, if the merchant is primarily a restaurant, the one or more first items or services may include menu items. If the customer answers correctly as shown in step 818 and no other items are added as done in 808, the flow transitions to step 820 otherwise the transaction is declined as per 822.

At 810, the merchant device 116 receives input for operating the application in a second mode of operation, the second mode of operation being associated with a second set of items. For instance, the merchant device 116 can receive input to transition from operating in the first mode of operation to the second mode of operation. In some instances, the input can include a selection of an input option being presented by the first user interface that is associated with the second mode of operation. In some instances, the input can include an identifier associated with an item or service. For instance, the merchant may scan a barcode of another item different from the first item, which causes the merchant device 116 to send a new challenge question to the customer.

In some instances, the merchant device 116 may receive the input during a single transaction between the merchant and a customer. For instance, the customer may be acquiring item(s) and/or service(s) from the merchant that are associated with both the first type of business and the second type of business. In some instances, the merchant device 116 may receive the input based on a second customer acquiring item(s) and/or service(s) from the merchant during a second transaction. For instance, after receiving the input describing the one or more first items or services, the merchant device 116 may attempt to authorize a payment instrument of the customer for a cost of the one or more first items or services. After authorizing the payment instrument, the merchant device 116 may receive the input for operating in the second mode of operation based on item(s) and/or service(s) being acquired by a second customer during a subsequent transaction.

At 812, the merchant device 116 transitions from operating the application in the first mode of operation to operating the application in the second mode of operation. For instance, based on the input, the merchant device 116 may transition to operating the application in the second mode of operation. As discussed above, the second mode of operation is associated with a second type of business. As such, the merchant device 116 may transition from operating in a mode of operation that is associated with a primary business purpose of the merchant (e.g., retail, services, restaurant, etc.) to operating in a mode of operation that is associated with a secondary business purpose of the merchant (e.g., retail, services, restaurant, etc.).

At 813, the merchant device 116 provides a second user interface associated with the second set of items. For instance, based on operating in the second mode of operation, the merchant device 116 may display a user interface that is associated with the second set of items. The user interface may include one or more input options or challenge query(s) 113 that are associated with items and/or services provided by the merchant, which are associated with the second set of items. For example, the one or more input options may be associated with retail items, services, or restaurant items based on the second type of business.

At step 814, the payment service generates via the second user interface another challenge question now based on the second set of items or a combination of the first and the second set of items and sends to the customer to respond.

At 816, the merchant device 116 receives, via the second user interface, input describing one or more second items or services. For instance, the merchant may utilize the one or more input options to input information describing one or more second items or services being acquired by a customer during a transaction. The one or more second items or services may be associated with the second type of business. For instance, the one or more second items or services may be associated with a secondary business purpose of the merchant. For example, if the merchant' secondary business purpose includes retail, the one or more second items or services can include retail items. For a second example, if the merchant's secondary business purpose includes providing services, the one or more second items or services can include services. For a third example, if the merchant's secondary business purpose includes a restaurant, the one or more second items or services may include menu items.

In some instances, the merchant device 116 can then attempt to authorize a transaction between the merchant and a customer. For instance, if each of steps 808-816 is associated with a single transaction between the merchant and a customer, the merchant device 116 can attempt to authorize a payment instrument for a cost of the one or more first items or services and the one or more second items or services. However, if steps 810-816 are associated with a second transaction between the merchant and a customer, the merchant device 116 can attempt to authorize a payment instrument for a cost of the one or more second items or services.

In some instance, the process 800 can continually repeat starting at step 810. For instance, the merchant device 116 may receive input to operate in a new mode of operation. The new mode of operation can include the first mode of operation, the second mode of operation, a third mode of operation, or the like.

At step 818, the payment service validates the response provided by the customer to the correct answer. If the determination yields that the response is correct, the payment transaction is validated at step 822 otherwise the payment transaction is declined at step 820.

Although the examples for above for process 800 are described with types of business that include retail, services, and restaurant, the above process 800 can be utilized for other types of business. For example, the above process 800 can be utilized for types of business that are associated with various MCCs. For another example, the above process 800 can be utilized for types of business that are more specific to merchants. For instance, a type of business can include retailer merchants that provide sporting equipment, or restaurants that provide barbeque food items.

Figure 9:
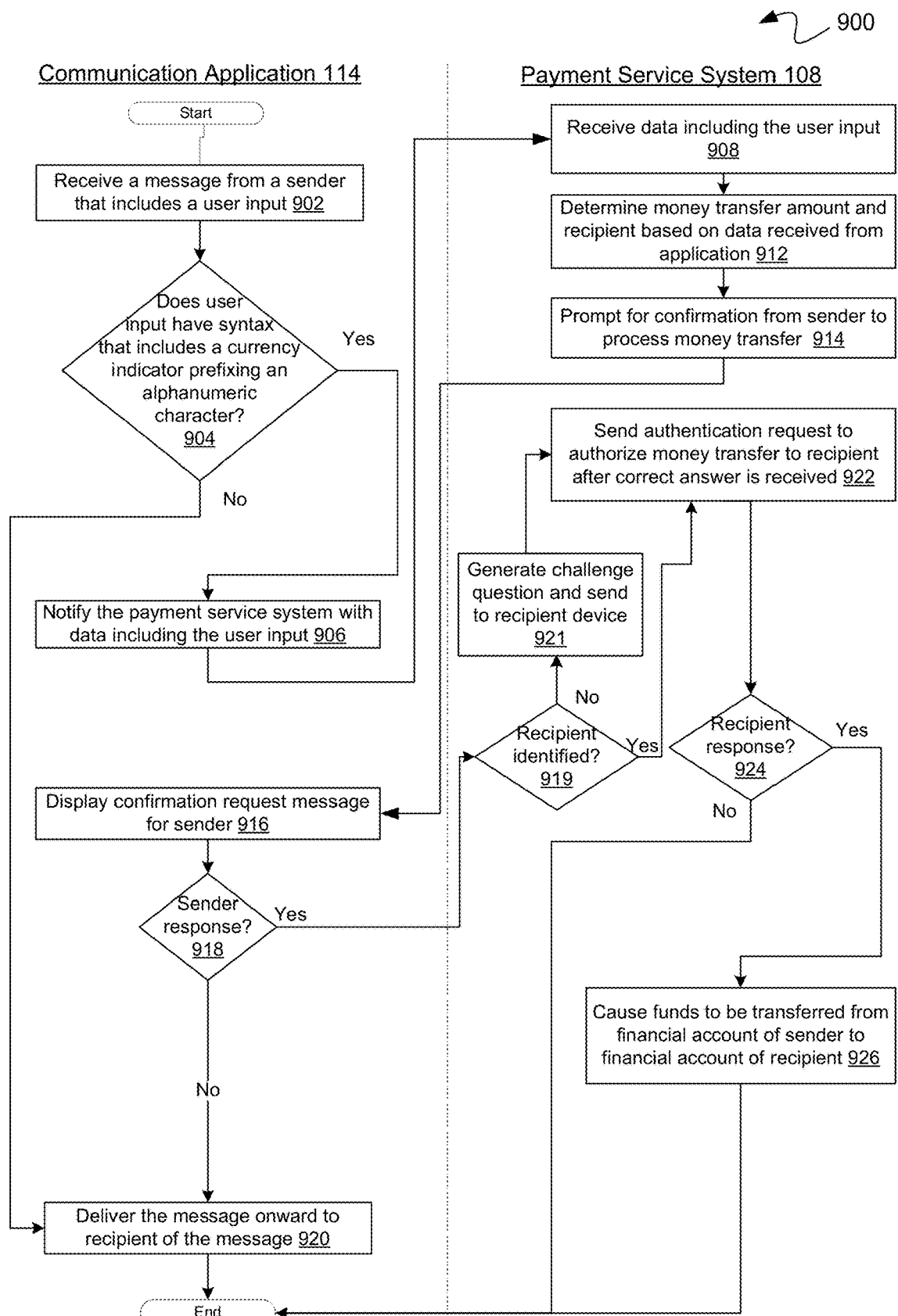
FIG. 9 illustrate a flow diagram of an example process for generating challenge query(s) for a recipient to answer as a method of authentication in the context of an electronic person-to person transaction.

FIG. 9 illustrates a flow diagram of an example process 900 for executing authentication of a cash transaction in the context of the cash tagging technology, in accordance with some embodiments. In one embodiment, the method 900 is carried out by a communication application (such as a person-to-person working in coordination with the PSS 108. In some embodiments, a server computer system associated with the communication application, such as communication application 114 can perform the method 900 in coordination with the PSS 108. As discussed in reference to FIG. 1, the communication application 114 may be executing on the client device 105 of the sender or recipient 104.

At block 902, the communication application 114 receives a message inputted by the sender, e.g., sender, where the message includes one or more user inputs.

At decision block 904, the communication application 114 determines (e.g., parsing) whether any of the user inputs in the message triggers a tagging mechanism in the form of a currency indicator (e.g., $). Based on the detection of the currency indicator, the application 114 can determine the user's intent, or indication, to transfer money, and can execute, or trigger execution, of such money transfer, without requiring an explicit command from the user to transfer the money. The communication application 114 further determines whether that user input prefixes one or more numeric characters (e.g., 1, 5, 20, 100, etc.), which may be stored or used in block 912. If the message includes a user input that contains the currency indicator prefixing an alphabetic or a numeric character ("Yes" branch), the communication application 114 can trigger execution of the money transfer by transmitting a message to notify the PSS, such as PSS 108, as indicated in block 906. If there is not a user input in the message that contains the specified syntax (i.e., currency indicator prefixing one or more alphanumeric characters), the communication application 114 continues with its communication functionality by transmitting, or delivering, the message to the recipient of the message, as indicated in block 920.

At block 908, the PSS 108 receives the message from the communication application 114, and parses the message for identification information of the sender and the recipient and the amount to be transferred in the money transfer request. At block 910, the PSS 108 identifies the money transfer amount and the recipient or a device associated therewith, such as devices 105 or 116, based on the parsed information. For example, the PSS 108 identifies the amount based on the second user input of "$5." In another example, the second user input may be set to a default value. In another example, the PSS 108 identifies the recipient based on the user input of "$alex."

At block 914, the PSS 108 causes a message to be sent to the sender to prompt for a confirmation that the sender wishes to transfer the money and also whether the recipient is the intended recipient. For example, the PSS 108 sends a message to the communication application 114 to cause it to display a message to prompt the sender for the confirmation, as indicated in block 916. Block 914 is executed to ensure, for example, the intention of the sender to send money when the sender submits the input of "$5" in the message received by the communication application 114. In one implementation, the PSS 108 can analyze interaction behavior of the sender and recipient with others and between each other to determine trends between the two. For example, the confirmation may be sent only when no interaction exists between the sender and recipient. However, if the transaction history indicates previous and/or frequent interaction between the two, the confirmation need not be requested from the sender.

At decision block 918, the communication application 114 determines whether the sender has responded with a confirmation. If the sender does not confirm and/or sends a confirmation (e.g., selects "No" or "Cancel" to cancel the money transfer request), the process 900 proceeds to block 920. If the sender does confirm (e.g., selects "Yes" or "Send cash"), the process 900 proceeds to block 919.

At decision block 919, the PSS 108 further determines whether there is a risk associated with the money transfer and whether the risk is higher than a predetermined threshold. For example, in one implementation, the PSS 108 determines the risk based on one or more trigger factors, including whether or not there has been a previous interaction between the recipient and sender, the amount of money being transferred, or the number of chargebacks on the recipient or sender account, just to name a few. It will be understood that these are examples of trigger factors, that is, factors that trigger the PSS 108 to generate challenge query(s), such as challenge query(s) 113 for the sender or recipient or both.

At block 921, after determining that the risk is higher than a threshold, the PSS 108 generates challenge query(s) 113 for the recipient to answer before the money transfer begins. To this end, the PSS 108 accesses database of transactions associated with sender, recipient or both to determine if there is a shared history of transactions. Additionally, the payment service can access a list of template query(s) 113 instead of dynamically generated query(s) 113 to ask of the customer.

The dynamic query(s) 113 are based on the shared history of transactions or other transactions performed by the recipient or sender with other users. Examples of query(s) 113 are "What did you send money for at 7 PM yesterday?" "How frequently do you send money to $abc?", "and so on. The payment service generates such query(s) 113 (and optionally their answers) and sends to the recipient device. The recipient device can then present the question on, for example, the communication application associated with the payment service to challenge the recipient in an attempt to authenticate the recipient. If the recipient correctly answers the question, where the correct answer is determined based on a mapping of recipient's response to the answer generated by the customer service, the payment service sends the authentication request to the issuer or card processing network to authorize the transfer of money between the two entities, as shown in block 922. However, if the recipient fails to provide a correct answer, the payment service may terminate the money transfer request or generate another challenge question for the recipient to answer.

At block 924, the PSS 108 sends a message to request acceptance of the money transfer request from the recipient. The PSS 108 can use the identification information associated with the recipient that has been received in the message at block 908 to deliver the acceptance request message. For example, the identification information associated with the recipient includes a telephone number, which can be used by the PSS 108 to send a text message to obtain the acceptance from the recipient. In another example, the identification information associated with the recipient includes an email address, which can be used by the PSS 108 to send a text message to obtain the acceptance from the recipient. In yet another example, the identification information associated with the recipient includes a unique identifier. In this example, the PSS 108 can perform a database lookup to identify information associated with the unique identifier, where that information can be used to reach out to the recipient. For example, that information can include an instant messaging username of the recipient. In this example, the PSS 108 can use the username as a reference that gets included in a request message to a server computer system associated with the communication application 114, where the request message prompts the server computer system to generate and send the acceptance request message to the recipient on behalf of the PSS 108. The acceptance request message can include, for example, a link that redirects to a landing page facilitated by the PSS 108. The PSS 108 determines whether the recipient has submitted a response to accept the money transfer amount included in the sender's money transfer request. If the PSS 108 receives an acceptance, the process 900 proceeds to block 926, at which the PSS 108 causes funds to be transferred from the financial account of the sender to the financial account of the recipient. If the PSS 108 does not receive an acceptance, the process 900 ends.

Figure 10:
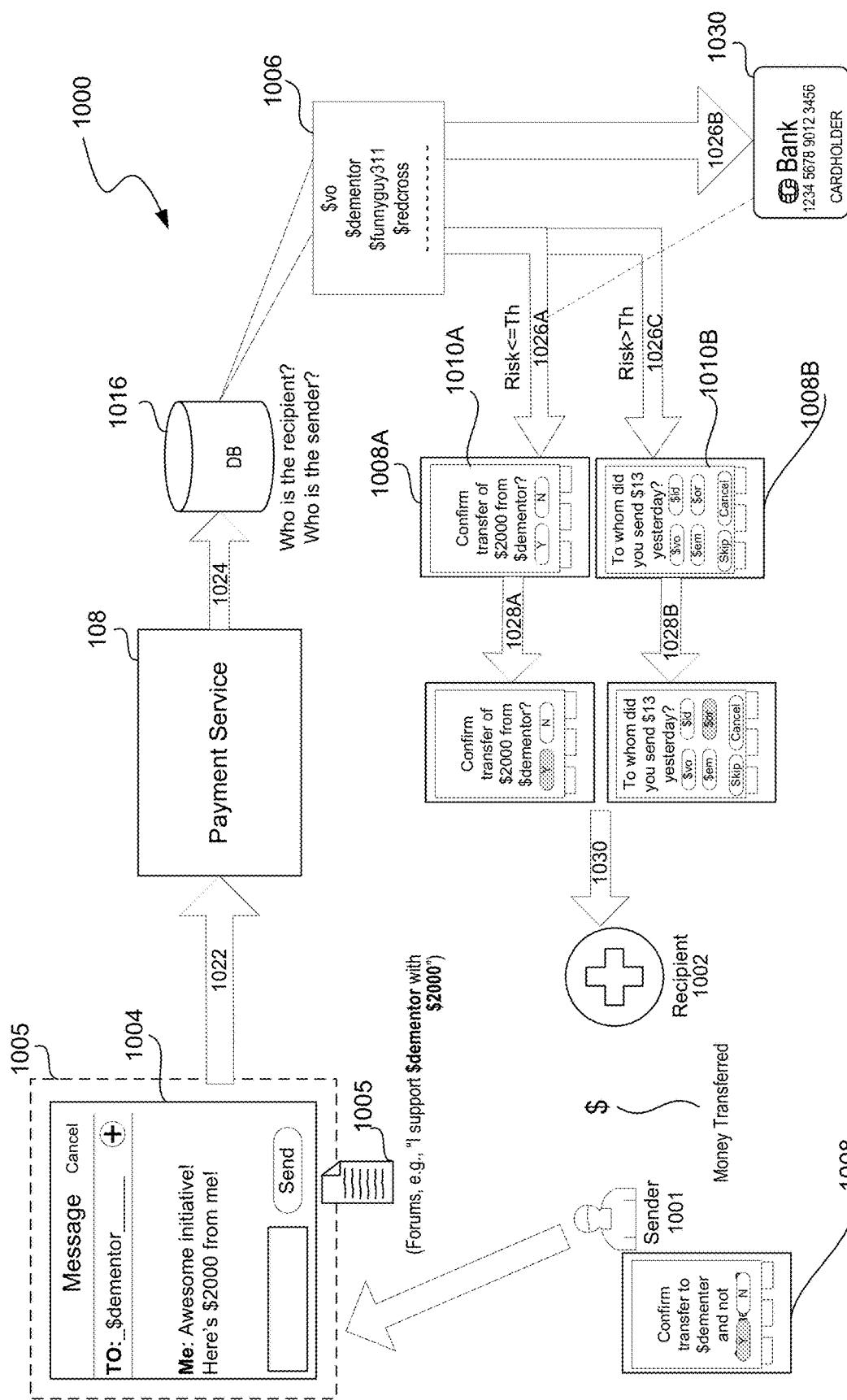
FIG. 10 illustrates a flow diagram of an example flow between a sender user and a recipient user in the context of an electronic person-to person transaction.

FIG. 10 illustrates a data flow diagram of an example money transfer process 1000 for creating challenge query(s), such as challenge query(s) 113 in the context of a money transfer process within a messaging application, forum or landing page context, in accordance with some embodiments.

The messaging application system 1005 can be, or include, the application server of FIG. 1 that is employed by, e.g., a messaging service associated with a telephone company, a messaging service associated with a native operating system associated with the sender's client device, or an instant messaging service associated with a cross-platform messaging service.

The computer system 1005 of a forum 1004 ("forum system 1005") and the PSS 108 are now described. The forum system 1005 can be, or include, the Web server of FIG. 1, that is employed by a content provider. The content provider can include social networking, blogging, or microblogging services. In some embodiments, the forum may also refer to an application or webpage of an e-commerce or retail organization that offers products and/or services. Such websites can provide an online "form" to complete before or after the products or services are added to a virtual shopping cart. The online form may include one or more fields to receive user interaction and engagement. Some of these fields may be configured to receive payment information, such as a payment proxy, in lieu of payment card mechanisms, such as credit cards, debit cards, prepaid cards, gift cards, virtual wallets, etc.

The process 1000 can also involve communication between a landing page 1004 that is associated with the PSS 108 and the PSS 108 of FIG. 1. The landing page 1004 can be executed by the one or more servers (e.g., a web server) of the payments service system 108. The landing page 1004 can be generated by the PSS 108 to receive, or collect, one or more payments on behalf of the recipient 1002 from one or more senders (e.g., 1001A, 1001B, 1001C, etc. —not shown). The landing page 1004 can be embodied as a website whose URL can be personalized based on a payment proxy associated with the recipient 1002. In particular, the landing page 1004 can be generated by canonicalizing the URL to a unique representation that includes at least a portion of the payment proxy to personalize the landing page 1004 for the recipient 1002. For example, a personalized landing page can have a URL that includes, for example, a monetary indicator preceding multiple alphabetic characters (e.g., www. . . . .com/redcross). In some embodiments, the URL can be different from the payment proxy, yet still be canonicalized for ease of use in transferring money to the recipient 1002 via the landing page 1004.

Note that while the process 1000 is described for a particular sender sending money to the recipient 1002, in other embodiments, the process 1000 can be executed for multiple senders (e.g., sender 1001 1-N, where N is an integer greater than 1), where each sender can send money to the recipient 1002 through the set of operations involved in the process 1000. In such embodiments, the individual payment amounts from the multiple senders 1001 1-N can be aggregated into an accumulated payment amount that gets transferred, by the PSS 108, to the recipient 1002.

In one implementation, the money transfer flow 1000 begins at an instant messaging application 1004 installed on a mobile device (e.g., smartphone) of a user, or a sender, for example named "Betty." The sender inputs a first message "here's $2000 from me" to be sent to another user, or a recipient, named "dementor," who can receive the first message on another instant messaging application 1004 executing on his mobile device. The message includes one or more inputs from the sender. The instant messaging application 1004 detects (e.g., based on parsing the message) that the message includes an input that contains "$2000", where the input has a syntax of a monetary currency indicator "$" prefixing one or more numeric characters "2000." The money transfer process 300 involves the instant messaging application 1002 transmitting the message to the recipient (either 1010A or 1010B) upon submission by the sender (e.g., sender interacts with an action button by clicking "Send"), as opposed to generating a message prompting for confirmation.

The recipient can receive the message as the message displayed by the instant messaging application 1004. In some embodiments, the instant messaging application 1004 causes at least a portion of the input to be emphasized on a user interface for the sender upon detection of the syntax in the input (e.g., bolded or highlighted text indicative of a monetary amount for money transfer). With the emphasis, the instant messaging application 1004 can also associate a selection action with a monetary amount represented by the emphasized portion of the input. The sender can initiate the money transfer by interacting with the selection action to confirm intent to transfer money (e.g., click or touch the emphasized portion as displayed on the user interface). Accordingly, such confirmation via the selection action triggers a process to transfer an amount that is associated with the selection action (e.g., 10 dollars). In embodiments described herein, the selection action also triggers the PSS 108 to determine the risk, as per one or more risk models, associated with the transfer. For example, based on past trends and behavior of the sender and/or recipient, the PSS 108 can flag the current transaction as an anomaly or distinct behavior. Accordingly, before making the transfer, the PSS 108 requests the recipient to provide additional information as a way to authenticate the recipient 1002. In some cases, the sender may also be asked to confirm by answering a challenge question or providing other recipient options to the sender based on history. For example, the sender may be asked "did you intend to send the money to $dementer instead"?

Thus, in response to the selection action, the instant messaging application 1004 can generate a message to prompt the sender for confirmation. The message (not shown) can be a "pop-up" message or webpage that disappears upon selection of an action button by a viewer (e.g., the recipient). For example, the sender can select a "Send cash" action button included in the message to confirm the sender's intent to send money by submitting the input. Alternatively, the sender can select a "Cancel" action button included in the message to cancel any initiation of the money transfer. In another implementation, the sender can select the suggested payment proxy from the PSS 108. The placement of the pop-up message is for discussion purposes only and may or may not be proximal to the last sent or received message.

Upon receiving the confirmation from the sender, the instant messaging application 1004 sends either a message 1010A or 1010B to the recipient (i.e., $dementor) displayed at the instant messaging application 1004. The PSS 108 takes one of the two paths based on a level of risk associated with the transaction. For example, if the amount of funds is greater than a threshold or if the recipient and sender have never interacted before, the PSS 108 may generate a challenge question for the recipient to respond.

The PSS 108 generates challenge question by parsing sender and/or recipient's past transactions from database 1016. The PSS 108 may also analyze the sender or recipient's behavior by extrapolating the information or by executing behavior or trend analysis so as to determine query(s) 113 for sender or recipient like "how often do the sender and recipient interact?" or "when was the last time recipient received $2000?" and so on. Such query(s) 113 may be dynamically generated taking into past and/or current transactions or money transfer requests, or even statically generated from a database of query(s) 113. In some implementations, if the PSS 108 is also connected to one or more merchants where the sender or recipient shop for items or services, query(s) 113 may also relate to their shopping behavior or transaction history. Alternatively, or additionally, the challenge query(s) 113 may be generated from an external source and then subsequently stored in the challenge question database. For example, the recipient or sender may use a browser on a personal computer or the like to supply specific challenge query(s) 113 to the PSS 108 via a communication medium (not shown) such as the Internet. In some embodiments, a customer may determine the kinds and/or quantity of challenge query(s) 113 to ask himself or herself. For example, the customer may specify that the customer wants to be asked three challenge query(s) 113 if the consumer visits a jewelry store, but only one question if the customer visits a fast food restaurant. The types of query(s) 113 posed by the customer may be based on the merchant type, frequency of purchasing, etc.

In some embodiments, upon receiving the confirmation, the instant messaging application 1004 first transmits, via a communications network, a message regarding the confirmation to the messaging server. The messaging server can then communicate, via a same or different communication network, with the PSS 108 regarding the confirmation received from the sender. The PSS in turn can transmit a return message to the messaging server, where the return message is configured to cause the messaging server to transmit the message to the recipient's mobile device at the instant messaging application. In other embodiments, the instant messaging application, upon receiving the confirmation (e.g., via interaction with the message), communicates with the mobile payment application executing on the sender's mobile device. The mobile payment application then communicates with the PSS 108, which in turn, sends a return message to the mobile payment application. The return message is configured to cause the mobile payment application to instruct the instant messaging application to transmit the message to the recipient's mobile device for display at the instant messaging application 1004.

In some embodiments, the message 1010A and 1010B can be a pop-up message, as opposed to a message within the instant messaging application. The message 1010A or 1010B further includes a hyperlink that redirects the recipient to a landing page, such as a webpage.

In the contest of a forum, the forum system 1005 works in coordination with an API associated with the PSS 108 to monitor the content made or created by the users of the forum 1004. The content can include, for example, user messages, posts, comments, user interactions, etc. (hereinafter, "user messages," for ease of discussion of the process 1000). In particular, the forum system 1005 monitors the user messages to detect an indication of an intent to transfer money from a particular user (e.g., the sender 1001) to a particular recipient (e.g., the recipient 1002). The forum system 1005 detects the indication of the intent based on an identification of a syntax, or more specifically, an input, within any one of the user messages, that has a particular syntax. In some embodiments, the detection can be based on a parsing of the user messages to identify the syntax. In some embodiments, any syntax in a form field dedicated for a payment proxy can be identified as intent. As discussed above, the syntax includes a monetary indicator preceding one or more alphanumeric characters. The input having the syntax is representative of a payment proxy at which the sender 1001 wishes to send money. The input can be a string of characters that include the monetary indicator and one or more alphabetic characters. For example, the input is $dementor. In another example, the input is $aaron. The input can be a string of characters that include the monetary indicator and one or more alphabetic characters and numeric characters. For example, the input is $dementor123. In another example, the input is $aaron315.

The sender 1001, for example, accesses a social networking website and posts a message "I support $dementor with $2000," on the social networking website (e.g., a social profile page of the sender 1001 or another user). The Web server can identify the sender user's intent to transfer money to the recipient user 1002 based on an identification of the payment proxy "$dementor" included in the posted message 1003. Note that the sender 1001 may not have any personal relationship with the recipient 1002, and as such, may not know a phone number, an email address, or any other personal contact information of the recipient 1002. However, the sender 1001 can send money to the recipient 1002 by specifying, in the message 1003, the payment proxy associated with the recipient 1002. The recipient 1002 can "advertise" or otherwise display a payment proxy of the recipient 1002 to be seen by the sender 1001, e.g., on a website (e.g., personal homepage), on a billboard, on a pamphlet, on a flyer, etc. The sender 1001, who wishes to send money to the recipient 1002, e.g., as support for the recipient 1002, can use the displayed payment proxy to send money.

Referring back to the process 1000, upon identification of any message that includes an input having the syntax, the forum system 1005 sends a notification message (e.g., an API request) to the PSS 108, as indicated by block 1022. The notification message can include the identified user message and any other data associated with the user message and/or the user who has created that user message (e.g., the sender 1001). The other data, or information, can include, for example, a sender identifier associated with the user. Such identifier can include, for example, an email address of the sender 1001 or a phone number of the sender 1001. As discussed above, the sender identifier can be derived from a user account registered with the forum system 1005.

Upon receiving the notification, the PSS 108 parses the user message to identify the input having the syntax (i.e., the payment proxy), and more specifically, to identify who is the recipient of the money transfer, as indicated by block 1024.

Based on the payment proxy, the PSS 108 can identify a recipient financial account. In some embodiments, the PSS 108 identifies the recipient financial account by accessing a database, e.g., the DB 1016, which maintains data 1006 relating to user accounts and associated financial accounts in one or more database tables. In such embodiments, the PSS 108 performs a database lookup to determine who is the recipient associated with the payment proxy (e.g., Is there a user of the PSS 108 that is associated with the payment proxy $dementor?). For example, the PSS 108 searches one or more database tables of the DB 1016 for, e.g., $dementor. An example of the database tables storing the data. Within the database tables of the DB 1016, the recipient user account can be represented by an identifier associated with the recipient. The identifier can include, for example, an email address, a telephone number, an application ID, a device ID, or biometric data (e.g., fingerprint, iris, voice, facial features, etc.) In some embodiments, the recipient user account is the payment proxy.

Upon identifying the recipient user account, the PSS 108 further determines a level of risk associated with it to determine whether or not an additional authentication step should be triggered. For example, a request may be higher than a risk threshold if the amount being transferred is more than a predetermined amount. The sender may customize the threshold value or other risk trigger factors. For example, if the sender is likely to misspell the names, the sender may customize the PSS 108 to generate a challenge question for every recipient and sender. It is also possible that the account of the sender or recipient may be taken over by a fraudulent user. Such account takeover scenarios will also trigger the challenge questions for the sender or the recipient or both.

If the risk is higher than a threshold, the authentication step is generated by the PSS 108. The PSS 108 analyzes the transaction history 1016 of the sender and recipient to determined patterns, behavior and trends with respect to mutual interaction, nature of such interaction, frequency of money transfer requests, and so on. In some cases, the PSS 108 also compares the recipient name to other names in the sender's contact list, accessible through sender device or stored on the PSS under user account, to determine if the sender has inadvertently sent the money to the wrong recipient. For example, if the name entered by the sender matches another name in sender's contact list within a tolerance of error of, for example 2 or three letters, the PSS 108 may request the sender to confirm the transfer and optionally, send options to the sender to select from the other names similar to the sender input name. Additionally, the name-matching may trigger the PSS 108 to send a challenge question to the sender to input recipient name. In some implementations, an analysis of the sender history may indicate that the sender has been sending money to "$dementer" and not "$dementor" or sends a fixed amount such as "$2000" on the same date to "$alex" and thus, the PSS 108 indicates to the sender some recommendations and a confirmation if the sender agrees with the initial entry of recipient name, such as shown in user interface 1008.

The PSS 108 parses and mines the database of transactions between sender and recipient and individual records to generate challenge query(s) 113, dynamically or selected from a static question database, for the recipient to answer to authenticate and confirm the acceptance of money from the sender as a security feature so that the sender does not inadvertently send money to the wrong recipient. In some cases, this may also be useful if the recipient does not want to receive huge amounts from unfamiliar senders.

If the risk level is more than or equal to the custom or static threshold, the PSS 108 identifies the recipient information from the database 1016 to send the generated challenge query(s) 113 to the recipient, for example in the form of a message, as shown in block 1026C. The message can be sent to the recipient by using an identifier of the recipient ("recipient identifier") that is stored in association with the recipient user account (and/or in association with the payment proxy). The recipient identifier can include, for example, an email address or a telephone number. For example, the PSS 108 sends an email message to an email address of the recipient 1002, where the email message includes a hyperlink that redirects the recipient 1002 to, e.g., a webpage that allows submission of debit card information associated with the debit card 1030. In another example, the PSS 108 sends a text message to a telephone number of the recipient 1002, where the text message includes a hyperlink similar to the one included in the example email message.

The PSS 108 may analyze the transaction history, as mentioned before, to generate the challenge query(s) 113 for both the recipient and/or sender either contemporaneously or after sender/recipient has provided the answer. In one implementation, the PSS 108 applies natural language to the detected trends to form query(s) 113 for the recipient as displayed on user interface 1008B on a recipient device or simply ask for confirmation as displayed on user interface 1008A on a recipient device. For example, as shown in user interface 1008B, the PSS 108 may ask the recipient "To whom did you send $13 yesterday?" along with multiple choice answers for the recipient to pick from. The answers to these questions or behaviors may be particularly unbeknownst to an unintended recipient in possession of the original recipient's device. Optionally, a text field may be provided for the user to enter the response. If the recipient is unable to answer the question, the recipient may skip so that the PSS 108 can generate another question for the recipient. If the recipient answers the query(s) 113 incorrectly, the request may be denied and transaction may get canceled. Accordingly, sender may be sent a message indicating as such. If the recipient is the correct recipient, the recipient would know the answers to certain query(s) 113. The PSS 108 centrally, or even the customer device locally, can determine whether the response is valid. Accordingly, the money transfer request is processed as shown in block 102B and 1030. In some implementations, the sender-recipient relationship may be associated with a static or dynamically changing PIN (stored in the PSS 108), and the recipient may enter the PIN every time the sender sends something to validate the payment transaction. In yet other implementations, once the recipient answers a question correctly, the PSS 108 may set a certificate to keep the recipient validated forever or for a window of time, as set by the sender. For example, the recipient and sender may be able to send and receive money despite the risk levels if the certificate is valid. The certificate may be saved locally on sender and recipient devices, mobile payment applications, or centrally at the server level.

If the risk level is less than the custom or static threshold, the PSS 108 identifies the recipient financial account associated with that user account and proceeds to process the transaction, as indicated by block 1026A. In some embodiments where the recipient user account is the payment proxy, the PSS 108 simply identifies the recipient financial account without first identifying the recipient user account registered with the PSS 108. To identify the recipient financial account, the PSS 108 can determine the financial account information that identifies that recipient financial account. The financial account information can include, for example, card number, expiration date, CVV, billing address, routing number, etc. The recipient financial account can be associated with, for example, a debit payment card 1030.

If the PSS 108 is unable to identify the recipient financial account, the PSS 108 can send a message to request financial account information from the recipient 1002 (e.g., a confirmation message that includes a financial account request message), who can provide financial account information (e.g., debit card information), as indicated by block 1026B. The message can be sent to the recipient by using an identifier of the recipient ("recipient identifier") that is stored in association with the recipient user account (and/or in association with the payment proxy). The recipient identifier can include, for example, an email address or a telephone number. For example, the PSS 108 sends an email message to an email address of the recipient 1002, where the email message includes a hyperlink that redirects the recipient 1002 to, e.g., a webpage that allows submission of debit card information associated with the debit card 1030. In another example, the PSS 108 sends a text message to a telephone number of the recipient 1002, where the text message includes a hyperlink similar to the one included in the example email message.

The PSS 108, upon notification, also determines who is the sender 1001 (as indicated by block 1024), and more specifically a financial account of the sender 1001 ("sender financial account") to process the money transfer. The PSS 108 can identify the sender 1002 by using the other information, such as the sender identifier, included in the notification message from the forum system 1005. In particular, the PSS 108 accesses the database 1016, which maintains data 1006 about user accounts and associated financial accounts in one or more database tables, to identify whether, e.g., the email address of the sender 1001, exists in the database 116. Upon finding the sender identifier, the PSS 108 determines the sender financial account. Note that the sender 1001 may not already have an account with the PSS 108, but would still be able to transfer money to the recipient 1002 by use of the payment proxy. In such scenario where the sender 1001 is not yet known to the PSS 108, the PSS 108 sends a message (e.g., a confirmation message of the intent of the sender 1001 to transfer money) to request for financial account information, as indicated by block 1026B. The financial account information identifies a sender financial account, which can be associated, for example, with a payment card, such as the debit card 1030.

In addition to identifying the sender financial account and the recipient financial account, the PSS 108 also determines a payment amount that the sender 1001 desires to send to the recipient 1002. The PSS 108 can determine the amount by analyzing the message to identify a second input that has the syntax of the monetary indicator preceding one or more alphanumeric characters. In particular, the PSS 108 parses the message to identify the second input representative of the payment amount. The second input can be a string of characters that includes the monetary indicator and one or more numeric characters. For example, the amount can be identified based on the input, "$2000," included in the message. In some embodiments, the PSS 108 can determine the amount by analyzing the message to identify an input that includes one or more numeric characters, without the input having the syntax. For example, the PSS 108 parses the message to identify the amount based on an identification of the input "$2000." In some embodiments, the amount can be parsed from the message based on natural language processing and/or context of the message 1003.

Once both the sender financial account and the recipient financial account are identified (or submitted to the PSS 108 via the confirmation message), the PSS 108 proceeds at block 1026A to initiate a transfer of money as shown by 1030. Initiating the money transfer can include, for example, the PSS 108 communicating a request to a card issuer of the sender 1001 to transfer the money. In another example, the PSS 108 processes a card of sender 1001 e.g., a credit card or a debit card, holds the payment amount on behalf of the recipient 1002, and can forward the payment amount to the recipient 1002 once a financial account has been linked with the PSS 108. Alternatively, the PSS 108 can generate a transaction using ACH that debits an amount from a bank account of the sender 1001 and can credit the amount into a bank account of the recipient 1002, e.g., using ACH, or onto a debit account, e.g., over debit rails, of the recipient 1002.

In some embodiments, initiating the money transfer includes sending a confirmation message to a user to obtain financial account information from that user, as shown in 1028A. In such embodiments, the PSS 108 may not have the financial account information of both the sender 1001 and the recipient 1002. The PSS 108 can send to the user a confirmation message that includes a confirmation link that redirects the user to a page (e.g., a web page or a GUI of an application) that contains a form, e.g., a web form with fields, that the user can submit the financial account information. Once the financial account information is received, the PSS 108 can cause money to be transferred, e.g., by sending a request to an appropriate card issuer, or by processing a card, or by using ACH (as discussed above).

If the sender financial account information cannot be identified, the PSS 108 can send the confirmation message to the sender 1001. For example, the PSS 108 sends the confirmation message to the sender 1001 by using a sender identifier, e.g., an email address received from the forum system 1005. The confirmation message includes a confirmation link that prompts the sender 1001 to confirm the intent to transfer money to the recipient 1002 (identified based on association with the payment proxy included in the message). The sender 1001 can confirm by engaging with the confirmation link. For example, the confirmation link is a URL link that redirects the sender 1001 to a web form with fields that prompts the sender 1001 to submit financial account information in order to confirm the money transfer to the recipient 1002. In such an example, the sender 1001 can engage with the URL link by clicking and entering the financial account information into the web form, e.g., via a touch screen display, a mouse, or any other input/output device of a sender device of the sender 1001.

If the recipient financial account information cannot be identified, the PSS 108 can send the confirmation message to the recipient 1002. For example, the PSS 108 sends the confirmation message the recipient 1002 using a recipient identifier stored in association with the payment proxy, e.g., an email address. The confirmation message includes a confirmation link that prompts the recipient 1002 to accept the money transfer from the sender 1001 (identified based on a sender identifier associated with the message). The recipient 1002 can confirm by engaging with the confirmation link. For example, the confirmation link is a URL link that redirects the recipient 1002 to a web form with fields that prompts the recipient 1002 to submit financial account information in order to confirm the money transfer from the sender 1001. In such an example, the recipient 1002 can engage with the URL link by clicking and entering the financial account information into the web form, e.g., via a touch screen display, a mouse, or any other input/output device of a sender device of the sender 1001.

In some embodiments, the PSS 108 sends a confirmation message to a user simply to obtain a confirmation, even if the financial account of the user has already been identified. In such embodiments, the confirmation message operates as a safety measure to ensure that it is the user that wishes to participate in the money transfer. This can be beneficial, for example, for the sender 1001 who may have inadvertently triggered the money transfer, may have entered the incorrect payment proxy (e.g., $redcross versus $red4cross), and/or may have changed his/her mind and wishes to cancel the money transfer. On the other hand, the recipient 1002 may also benefit from receiving a confirmation message, for example, to verify who has sent money and/or to decline the money from the sender 1001.

Figure 11:
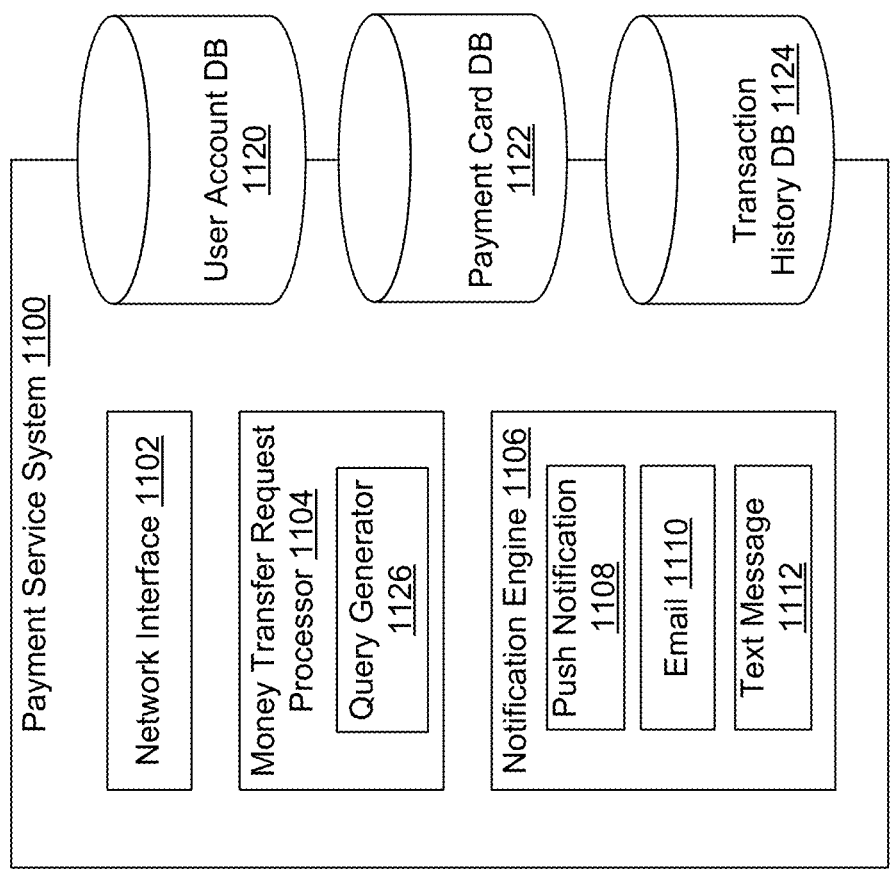
FIG. 11 illustrates of an example computing device for enabling the disclosed technology in the context of person-to-person money transfer.

FIG. 11 illustrates an example of a processing system with which some embodiments of the authentication technology can be utilized; especially in the context of a money transfer process. In some embodiments, the processing system controller 1100 can be the payment service ("PSS") 108 described in FIG. 1. In some embodiments, the PSS 1100 can be the PSS 108 of FIG. 1. The PSS 1100 includes a network interface 1102, a money transfer request processor 1104, a query generator 1126, and a notification engine 1106

("request engine 1106"). In some embodiments, the PSS 1080 further includes one or more databases, such as a user account database 1120 ("DB 1120"), a payment card database 1122 ("DB 1122"), and a transaction history database 1124 ("DB 1124"). The database 1124 may also include a history of challenge query(s) 113 presented to the user. The user account database 1120 includes information pertaining to the senders and recipients, such as their payment proxy, the email addresses, or phone numbers associated thereto.

The network interface 1102 can be a networking module that enables the PSS 1100 to transmit and/or receive data in a network with an entity that is external to the PSS 1100 (e.g., a remote server associated with a communication application), through any known and/or convenient communications protocol supported by the PSS 1100 and the external entity. The network interface 1102 can include one or more of a network adaptor card, a wireless network interface card (e.g., SMS interface, WiFi interface, interfaces for various generations of mobile communication standards including, but not limited to, 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

Each of the DBs 1120, 1122, and 1124 can include, for example, one or more hard drives (which may be further coupled together using RAID-0, 1, 5, 10, etc.), a centralized or distributed data cluster, a cloud-storage service provider, or other suitable storage systems suitable for storing digital data. The DB 622 can store various fields of data, such as user identifiers (IDs) (e.g., email addresses, telephone numbers, usernames, unique IDs associated with the cash tagging technology ("payment proxy") (e.g., $alex), device IDs, etc.), user profile information, shipping address, billing address, and/or the like. The DB 1122 can store various fields of data, such as user identifiers associated with payment cards, payment card/account numbers, expiration dates, card/account type, CVVs, billing addresses, and/or the like. The DB 1124 can store various fields of data, such as transaction identifiers (IDs), user identifiers (IDs), transaction dates/times, amounts, transaction participant identification information (e.g., email addresses or telephone numbers associated with the senders and recipients of money transfer transactions), and/or the like.

The PSS 1080 can access the databases 1120, 1122, and 1124 to retrieve and/or store data for executing the cash tagging technology and generating query(s) 113 as per the transactions. In particular, the PSS 1080 can search the databases 1120, 1122, and 1124 for data stored in association with other relevant data needed to process money transfers associated with the cash tagging technology and generate authentication query(s) 113 for the sender or recipient to answer if a trigger condition is met. For example, the PSS 1080 can store, in any of the databases 1120, 1122, and 1124, a newly created payment proxy of a user (e.g., sender user or recipient user) in association with another identifier associated with the user (e.g., telephone number, email address, instant message username, etc.). In this example, the PSS 1100 can create the payment proxy in response to, for example, the user registering for a money transfer service via the tagging mechanism, which is provided by the PSS 1100. The registration can include, for example, the user submitting payment card information for the PSS 1100 to process the money transfer service. In another example, the PSS 1100 can search and retrieve, from the databases 1120, 1122, and 1124, a user's email address that is stored in association with the user's payment proxy.

The money transfer request processor 1104 ("processor 1104") can process money transfer requests associated with the cash tagging technology as described in detail throughout the specification. For example, the processor 1104 can receive a money transfer request from a communication application (and/or a server computer system associated with the communication application), parse the money transfer request to extract details such as identification information that identifies a money sender (e.g., telephone number), identification information that identifies a money recipient (e.g., a payment proxy), the amount, and the like. The processor 1104 can check, based on the identification information associated with the money sender and the money recipient, respectively, whether the respective identification information are associated with one or more payment cards of the money sender and recipient, respectively. For example, the processor 1104 accesses the DBs 1120, 1122, and/or 1124 to determine whether the money sender's telephone number is associated with payment card data that identifies the money sender's payment card. In another example, the processor 1104 accesses the DBs 1120, 1122, and/or 1124 to determine whether the payment proxy of the money recipient is associated with payment card data that identifies the money recipient's payment card. The processor 1104 can then initiate a transfer of an amount associated with the money transfer request from, e.g., a bank account funding the money sender's payment card to a bank account associated with the money recipient's payment card.

In some embodiments, users (e.g., the money sender and the money recipient) can have mobile applications installed on their mobile devices. In such embodiments, the money transfer requests associated with those users can cause the notification engine 1106 to generate and send push notifications using a push notification module 1106. In some embodiments, a push notification for a money transfer request may be generated based on information included in the money transfer request, and can prompt the user to confirm or cancel the money transfer request. For example, a push notification can be a message that prompts a sender user to confirm she wants to send money to a recipient (i.e., confirm her intent to send money when she has submitted an input with a specified syntax). In some embodiments, the push notification can prompt the user to provide payment card information associated with a payment card of the user to process the money transfer request. Based on the user's response, the PSS 1100 can process the money transfer request by initiating transfer of an amount of funds corresponding to the money transfer request.

In some embodiments, the notification engine 1106 can include an email notification component 1110 to generate and send email notifications. In such embodiments, the notification engine 1106 is able to communicate with users who may not have the mobile application installed on their mobile devices and/or may not have mobile devices. An email notification generated by the email notification component 1110 can be in the form of an electronic mail, or email message, that prompts a user to confirm or cancel a money transfer request. In some embodiments, the email message can prompt the user to provide payment card information associated with a payment card of the user to process the money transfer request.

In some embodiments, the notification engine 1106 can include a text notification module 1112 to generate and send text message notifications. In such embodiments, the notification engine 1106 is able to communicate with users who may not have the mobile application installed on their mobile devices. A text message notification generated by the text notification module 1112 can be in the form of a text message that prompts a user (e.g., a money sender user) to confirm or cancel a money transfer request. In some embodiments, the text message can prompt the user to provide payment card information associated with a payment card of the user to process the money transfer request.

Note the notification engine 1106 and its associated modules can be utilized to communicate with recipient users, in addition to sender users. For example, the email notification module 1110 can generate an email message to obtain payment card information from a recipient user. In another example, the push notification module 1102 can generate a push notification to obtain payment card information from the recipient user. In yet another example, the text notification module 1112 can generate a text message to obtain payment card information from the recipient user.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system for authenticating a current payment transaction between a merchant and a customer; the system comprising a plurality of instances of a point of sale (PUS) application stored on a plurality of respective POS devices, the POS application configured to:
   send, to a payment processing system, itemization data identifying items purchased in one or more previous payment transactions associated with the customer; and
   send, to the payment processing system, payment card information of a payment card of the customer used to purchase the items purchased in the one or more previous payment transactions,
   wherein the current payment transaction is associated with a current instance of the POS application on a current POS device of the plurality of respective POS devices, and the payment processing system is configured to:
   receive, from the current instance of the POS application on the current POS device, information associated with the current payment transaction between the merchant and the customer, the information including at least one of the payment card information, itemization information, or information related to a particular item being purchased by the customer;
   based at least on the information associated with the current payment transaction and using a predictive model, outputting a risk score for the current payment transaction, wherein the predictive model is generated using machine learning based on training data comprising transaction data corresponding to a plurality of previous payment transactions associated with a plurality of other merchants and a plurality of other customers using payment cards of a plurality of issuers, wherein the transaction data comprises, for an individual previous payment transaction of the plurality of previous payment transactions, (i) at least one of an item purchased, a purchase amount, a time of purchase, a date of purchase, or a location, and (ii) whether the individual previous payment transaction was ultimately determined to be a fraudulent transaction;
   determine that the risk score is above a threshold;
   based on determining that the risk score is above the threshold, access, based on the payment card information, a database to identify the one or more previous payment transactions and respective itemization data associated with the payment card;
   compare the itemization data of the one or more previous payment transactions with data corresponding to the particular item being purchased by the customer with the payment card;
   generate, based at least on the comparing, a plurality of queries for the customer's response and corresponding answers; and
   send, to the current instance of the POS application, the plurality of queries and the corresponding answers,
   and wherein the current instance of the POS application is configured to:
   present a first query of the plurality of queries to the POS device;
   receive the customer's response to the first query, wherein the customer's response to the first query comprises an input associated with the first query;
   compare the customer's response to the first query to a first corresponding answer to the first query; and
   determine whether to validate the current payment transaction based at least in part on comparing the customer's response to the first query to the first corresponding answer, wherein:
      if the customer's response to the first query matches the first corresponding answer, validate and process the current payment transaction despite the risk score; and
      if the customer's response to the first query does not match the first corresponding answer:
         present a second query of the plurality of queries to the POS device;
         receive the customer's response to a second query, wherein the customer's response to the second query comprises an input associated with the second query;
         if the customer's response to the second query matches a second corresponding answer to the second query, validate and process the current payment transaction despite the risk score; and
         if the second response to the second query does not match the second corresponding answer, refrain from validating the current payment transaction.

2. The system of claim 1, further comprising a rule engine, wherein the rule engine is configured to:
   formulate a set of static queries, wherein the set of static queries is arranged according to a merchant nature or items offered by the merchant; and
   present the set of static queries to the customer for authentication of the current payment transaction.

3. The system of claim 1, further comprising a component to generate, based at least in part on the risk score exceeding the threshold, the plurality of queries as a challenge to the customer on a customer device registered with the payment processing system, or as a notification on the customer device.

4. The system of claim 1, wherein the payment processing system is further configured to:
   generate a user interface to present the plurality of queries to the customer; and adapt the user interface to present a different query than the first query, based on at least one change in the items being purchased by the customer.

5. A method comprising:
receiving, from a first instance of a point of sale (POS) application stored on a POS device associated with a merchant of a plurality of merchants, information associated with a current payment transaction between the merchant and a customer, wherein the POS device is one of a plurality of POS devices, each POS device associated with the payment processing system and with one of the plurality of merchants, and each POS device including at least one instance of the POS application;
based at least on the information associated with the current payment transaction and using a predictive model, outputting, by the payment processing system, a risk score associated with the current payment transaction,
wherein the predictive model is generated using machine learning based on training data that includes transaction data corresponding to a plurality of previous payment transactions conducted by a plurality of other merchants of the plurality of merchants and a plurality of other customers with payment cards associated with a plurality of issuers;
determining, by the payment processing system, that the risk score is higher than a threshold;
at least partly in response to determining that the risk score is higher than the threshold and based at least partly on data regarding one or more previous payment transactions involving the customer, analyzing, by the payment processing system, the current payment transaction or at least one of the one or more previous payment transactions involving the customer to determine a transaction behavior of the customer at a location of the merchant or other locations associated with other merchants associated with the payment processing system;
obtaining, by the payment processing system, a plurality of queries and corresponding answers for the customer, wherein a query of the plurality of queries is based at least in part on the transaction behavior of the customer with respect to the merchant or to the other merchants;
receiving, at the first instance of the POS application or an application stored on a customer device associated with the customer, a first response to a first query of the plurality of queries;
if the first response matches a corresponding answer to the first query, validating, by the first instance of the POS application, the current payment transaction based on the first response irrespective of the risk score; and
if the first response is different from the corresponding answer to the first query:
receiving, from the first instance of the POS application or the application stored on the customer device, a second response to a second query of the plurality of queries;
if the second response matches a corresponding answer to the second query, validating the current payment transaction based on the second response irrespective of the risk score; and
if the second response is different from the corresponding answer to the second query, refraining from validating the current payment transaction.

6. The method of claim 5, wherein obtaining the plurality of queries includes accessing at least one of a set of static queries or generating a dynamic set of queries,
wherein accessing the at least one of a set of static queries includes:
formulating a set of static queries, wherein the set of static queries is arranged according to a merchant nature or items offered by the merchant; and
displaying the set of static queries to the customer for authentication of the current payment transaction; and
wherein generating the dynamic set of queries includes:
analyzing the one or more previous payment transactions involving the customer for historical trends or patterns to determine the transaction behavior;
determining whether the transaction behavior relates to the current payment transaction; and
creating the dynamic set of queries based on the determining.

7. The method of claim 5, wherein analyzing the one or more previous payment transactions involving the customer comprises determining the items associated with the one or more previous payment transactions involving the customer.

8. The method of claim 5, wherein the information associated with the current payment transaction includes at least one of payment card information obtained through the POS device, itemization information, or information related to an item being purchased by the customer, and the method further comprising:
accessing, by the payment processing system and based on the payment card information, a database to identify the one or more previous payment transactions involving the customer and respective itemization data associated with the payment card;
detecting, by the payment processing system, a behavioral pattern between the one or more previous payment transactions involving the customer and the current payment transaction based at least on a nature of the item being purchased by the customer or the payment card;
customizing, by the payment processing system and based at least on the behavioral pattern, at least one query of the plurality of queries and a corresponding answer for the customer in response to the current purchase transaction; and
sending, by the payment processing system and to the first instance of the POS application, the at least one query and the corresponding answer for a customer's response.

9. The method of claim 5, wherein the information associated with the current payment transaction includes at least one or more of: an identifier of the payment card being used for the current payment transaction; an identification of the customer with whom the current payment transaction is being conducted; a total amount of the current payment transaction; one or more items being acquired by the customer in the current payment transaction; prices of the individual items; time, place, and date of the current payment transaction; category of each item being purchased; or a category of the merchant.

10. The method of claim 5, wherein if the risk score is higher than the threshold, further comprising determining that a second customer is likely to be an intended customer instead of the customer presenting the payment card, the determining that the second customer is likely to be an intended customer comprising:

determining a geographical location associated with a client device of the second customer, wherein the geographical location associated with the client device is tied to a location identifier stored in the payment processing system; and generating, for display at the client device of the second customer, a notification indicating use, at the location of the merchant, of the payment card.

11. The method of claim 10, further comprising:

receiving input indicating that the customer did not perform the current payment transaction; and based at least in part on the input, declining the current payment transaction as fraudulent.

12. The method of claim 5, wherein the payment processing system presents at least one query on an application executing on the customer device or the POS device, wherein the application is built using a rule engine, the rule engine including at least:

a first code associated with instructions to present the at least one query on the customer device or the POS device; and a second code associated with instructions to receive input in response to the at least one query from the customer device or the POS device.

13. The method of claim 8, wherein:

a first user interface includes one or more first input options for inputting information describing items or services associated with the merchant; and a second user interface includes one or more second input options for inputting information describing items or services associated with other merchants.

14. A non-transitory computer readable medium storing a program causing a computer to execute a process of authenticating a current payment transaction between a merchant and a customer; the process comprising:

receiving, by a payment processing system and from a first instance of a point of sale (POS) application stored on a POS device associated with a merchant of a plurality of merchants, information associated with a current payment transaction between the merchant and a customer, wherein the POS device is one of a plurality of POS devices, each POS device associated with the payment processing system and with one of the plurality of merchants, and each POS device including at least one instance of the POS application;

based at least on the information associated with the current payment transaction and using a predictive model, outputting, by the payment processing system, a risk score associated with the current payment transaction, wherein the predictive model is generated using machine learning based on training data that includes transaction data corresponding to a plurality of previous payment transactions conducted by a plurality of other merchants of the plurality of merchants and a plurality of other customers with payment cards associated with a plurality of issuers;

determining, by the payment processing system, that the risk score is higher than a threshold;

at least partly in response to determining that the risk score is higher than the threshold and based at least partly on data regarding one or more previous payment transactions involving the customer, analyzing, by the payment processing system, the current payment transaction or at least one of the one or more previous payment transactions involving the customer to determine a transaction behavior of the customer at a location of the merchant or other locations associated with other merchants associated with the payment processing system;

obtaining, by the payment processing system, a plurality of queries and corresponding answers for the customer, wherein a query of the plurality of queries is based at least in part on the transaction behavior of the customer with respect to the merchant or to the other merchants;

receiving, at the first instance of the POS application stored on the POS device associated with the merchant or an application stored on a customer device associated with the customer, a first response to a first query of the plurality of queries;

if the first response matches a corresponding answer to the first query, validating, by the POS application, the current payment transaction based on the first response irrespective of the risk score; and if the first response is different from the corresponding answer to the first query:

receiving, from the first instance of the POS application or the application stored on the customer device, a second response to a second query of the plurality of queries;

if the second response matches a corresponding answer to the second query, validating the current payment transaction based on the second response irrespective of the risk score; and if the second response is different from the corresponding answer to the second query, refraining from validating the current payment transaction.

15. The non-transitory computer readable medium of claim 14, wherein obtaining the plurality of queries and corresponding answers includes accessing at least one of a set of static queries or generating a dynamic set of queries, wherein accessing the set of static queries includes:

formulating a set of static queries, wherein the set of static queries is arranged according to a merchant nature or items offered by the merchant; and displaying the set of static queries to the customer for authentication of the current payment transaction; and wherein generating the dynamic set of queries includes:

analyzing the one or more previous payment transactions involving the customer for historical trends or patterns to determine the transaction behavior;

determining whether the transaction behavior relates to the current payment transaction; and creating the dynamic set of queries based on the determining.

16. The non-transitory computer readable medium of claim 14, wherein the information associated with the current payment transaction includes at least one or more of: an identifier of a payment card being used for the current payment transaction; an identification of the customer with whom the current payment transaction is being conducted; a total amount of the current payment transaction; one or more items being acquired by the customer in the current payment transaction; prices of the individual items; time, place, and date of the current payment transaction; category of each item being purchased; and category of the merchant.

17. The non-transitory computer readable medium of claim 14, wherein if the risk score is higher than the threshold, further comprising determining a second customer likely to be an intended customer instead of the customer presenting the payment card, the determining of the intended customer further comprises:

determining a geographical location associated with a client device of the customer, wherein the geographical location associated with the client device is tied to a location identifier stored in the payment processing system;

generating, for display at the client device of the customer, a notification indicating use of the payment instrument at a location of the merchant;

receiving input indicating that the customer did not perform the current payment transaction; and based at least in part on the received input, declining the current payment transaction as fraudulent.

18. The non-transitory computer readable medium of claim 14, wherein:

the payment processing system presents the first query on an application executing on a customer device or a POS device, wherein the application is built using a rule engine, the rule engine including at least:

a first code associated with instructions to present the first query on the customer device or the POS device; and a second code associated with instructions to receive input in response to the first query from the customer device or the POS device.

19. The non-transitory computer readable medium of claim 14, the process further comprising presenting, based at least in part on determining the risk score exceeds the threshold, the query as a challenge to the customer on a customer device, or as a notification on the customer device registered with the payment processing system.

20. The non-transitory computer readable medium of claim 14, wherein the payment processing system is further configured to:

generate a user interface to present the query to the customer; and adapt the user interface to present a different query based on a change in the items being purchased by the customer.

* * * * *